United States Patent
Denli et al.

(10) Patent No.: US 11,520,077 B2
(45) Date of Patent: Dec. 6, 2022

(54) AUTOMATED RESERVOIR MODELING USING DEEP GENERATIVE NETWORKS

(71) Applicant: ExxonMobil Upstream Research Company, Spring, TX (US)

(72) Inventors: Huseyin Denli, Basking Ridge, NJ (US); Cody J. MacDonald, Houston, TX (US); Victoria M. Som De Cerff, Jersey City, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 442 days.

(21) Appl. No.: 16/685,700

(22) Filed: Nov. 15, 2019

(65) Prior Publication Data

US 2020/0183047 A1    Jun. 11, 2020

Related U.S. Application Data

(60) Provisional application No. 62/878,981, filed on Jul. 26, 2019, provisional application No. 62/826,095, (Continued)

(51) Int. Cl.
*G01V 99/00* (2009.01)
*G06N 20/20* (2019.01)
(Continued)

(52) U.S. Cl.
CPC .............. *G01V 99/005* (2013.01); *G01V 1/50* (2013.01); *G06F 17/18* (2013.01); *G06N 3/0454* (2013.01);
(Continued)

(58) Field of Classification Search
CPC ............. G01V 99/005; G01V 1/50; G01V 2210/6652; G01V 1/303; G01V 1/28;
(Continued)

(56) References Cited

U.S. PATENT DOCUMENTS 5,444,819 A    8/1995 Hoskins et al.
5,940,777 A    8/1999 Keskes
(Continued)

FOREIGN PATENT DOCUMENTS

| CN | 108 537 742 A | 9/2018 |
| EP | 0 561 492 B1 | 1/1998 |
| WO | WO 2017/188858 A1 | 11/2017 |

OTHER PUBLICATIONS

Rodrigo Exterkoetter et al., "Petroleum Reservoir Connectivity Patterns Reconstruction using Deep Convolutional Generative Adversarial Networks," 2018 7th Brazilian Conference on Intelligent Systems, p. 97-102 (Oct. 2018) (Year: 2018).*

(Continued)

*Primary Examiner* — Steven W Crabb
(74) *Attorney, Agent, or Firm* — Lempia Summerfield Katz LLC

(57) ABSTRACT

A method for generating one or more reservoir models using machine learning is provided. Generating reservoir models is typically a time-intensive idiosyncratic process. However, machine learning may be used to generate one or more reservoir models that characterize the subsurface. The machine learning may use geological data, geological concepts, reservoir stratigraphic configurations, and one or more input geological models in order to generate the one or more reservoir models. As one example, a generative adversarial network (GAN) may be used as the machine learning methodology. The GAN includes two neural networks, including a generative network (which generates candidate reservoir models) and a discriminative network (which evaluates the candidate reservoir models), contest with each other in order to generate the reservoir models.

28 Claims, 12 Drawing Sheets

Related U.S. Application Data filed on Mar. 29, 2019, provisional application No. 62/777,941, filed on Dec. 11, 2018.

(51) Int. Cl.

| | | |
|---|---|---|
| *G01V 1/50* | (2006.01) | |
| *G06F 17/18* | (2006.01) | |
| *G06N 3/04* | (2006.01) | |
| *G06N 3/08* | (2006.01) | |

(52) U.S. Cl.
CPC .............. *G06N 3/08* (2013.01); *G06N 20/20* (2019.01); *G01V 2210/6652* (2013.01)

(58) Field of Classification Search
CPC ........ G06F 17/18; G06N 3/0454; G06N 3/08; G06N 20/20
See application file for complete search history.

(56) References Cited

U.S. PATENT DOCUMENTS

| | | | |
|---|---|---|---|
| 6,374,185 | B1 | 4/2002 | Taner et al. |
| 6,438,493 | B1 | 8/2002 | West et al. |
| 6,662,112 | B2 | 12/2003 | Eastwood et al. |
| 6,735,526 | B1 | 5/2004 | Meldahl et al. |
| 7,844,402 | B2 | 11/2010 | Klein et al. |
| 8,055,026 | B2 | 11/2011 | Pedersen |
| 9,366,772 | B2 | 6/2016 | Imhof |
| 9,489,769 | B2 | 11/2016 | Luneburg et al. |
| 9,618,839 | B2 | 4/2017 | Witte et al. |
| 2013/0118736 | A1 | 5/2013 | Usadi et al. |
| 2014/0278311 | A1 | 9/2014 | Dimitrov et al. |
| 2015/0234070 | A1 | 8/2015 | Xu et al. |
| 2017/0364795 | A1 | 12/2017 | Anderson et al. |
| 2018/0106917 | A1 | 4/2018 | Osypov et al. |
| 2018/0120481 | A1 | 5/2018 | Allegar et al. |
| 2018/0306940 | A1 | 10/2018 | Basler-Reeder et al. |
| 2019/0064378 | A1 | 2/2019 | Liu et al. |
| 2019/0162868 | A1 | 5/2019 | Salman et al. |
| 2019/0169962 | A1 | 6/2019 | Aqrawi et al. |
| 2019/0250294 | A1 | 8/2019 | Salman |
| 2019/0302290 | A1* | 10/2019 | Alwon ............... G01V 1/282 |
| 2019/0383985 | A1 | 12/2019 | Salman et al. |
| 2019/0391295 | A1 | 12/2019 | Salman et al. |

OTHER PUBLICATIONS

Lei Huang, et al., "A scalable deep learning platform for identifying geological features from seismic attributes," The Leading Edge, p. 249-256 (Mar. 2017) (Year: 2017).*
Akcelik et al. (2011) "Multiparameter Material Model and Source Signature Full Waveform Inversion," *SEG San Antonio 2011 Annual Meeting*, pp. 2406-2410.
Andersson et al. (2004) "T-H-M-C Modelling of Rock Mass Behaviour—1: The Purposes, The Procedures and the Products", *Geo-Engineering*, pp. 433-438.
Araya-Polo et al. (2017) "Automated fault detection without seismic processing," *The Leading Edge*, vol. 36, pp. 208-214.
Arjovsky et al. (2017) "Wasserstein GAN", pp. 1-32.
Aster et al. (2013) "Tikhonov Regularization", *Parameter Estimation and Inverse Problems*, pp. 93-127.
Baan et al. (2000) "Neural networks in geophysical applications", *Geophysics*, vol. 65, No. 4, pp. 1032-1047.
Backus et al. (1967) "Numerical applications of a formalism for geophysical inverse problems", *Geophysical Journal of the Royal Astronomical Society*, vol. 13, pp. 247-276.
Bellemare et al. (2017) "The Cramer Distance as a Solution to Biased Wasserstein Gradients", pp. 1-20.
Chan et al. (2017) "Parametrization and the Generation of Geological Models with Generative Adversarial Networks", pp. 1-28.
Chave et al. (2012) "Introduction to the magnetotelluric method", *The magnetoelluric method: theory and practice*, Cambridge University Press, pp. 1-18.
Chen et al. (2016) "InfoGAN: Interpretable Representation Learning by Information Maximizing Generative Adversarial Nets", *30th Conference on Neural Information Processing Systems*, pp. 1-9.
Cubuk et al. (2018) "AutoAugment: Learning Augmentation Policies from Data", pp. 1-14.
Denli et al. (2013) "Full-Wavefield Inversion for Acoustic Wave Velocity and Attenuation," *SEG Houston 2013 Annual Meeting*, pp. 980-985.
Duchi et al. (2011) "Adaptive subgradient methods for online learning and stochastic optimization", *Journal of Machine Learning Research*, vol. 12, pp. 2121-2159.
Etgen et al. (2009) "An overview of depth imaging in exploration geophysics", *Geophysics*, Vo.74, pp. WCA5-WCA17.
Etqen et al. (2010) "Introduction to this special section: Reverse time migration" *The Leading Edge*, vol. 29, p. 1363.
Fedus et al. (2018) "Many Paths to Equilibrium: GANs Do Not Need to Decrease a Divergence at Every Step", *International Conference on Learning Representation*, pp. 1-21.
Gibson et al. (2003) "Automatic Fault Detection for 3D Seismic Data," *DICTA* pp. 821-830.
Goodfellow et al. (2014) "Generative Adversarial Nets," *Advances in Neural Information Processing Systems 27, NIPS*, pp. 1-9.
Guillen et al. (2015) "Supervised learning to detect salt body", *SEG New Orleans 2dl5 Annual Meeting*, pp. 1826-1829.
Gulrajan et al. (2017) "Improved Training of Wasserstein GANs", *CORR*, pp. 1-11.
Dave Hale (2013) "Methods to compute fault imaqes extract fault surfaces, and estimate fault throws from 3D seismic images" *Geophysics*. Vol. 78. pp. 033-043.
Hami-Eddins et al. (2012) "Anomaly Detection using dynamic Neural Networks, classification of prestack data", *SEG Las Vegas 2012 Annual Meeting*, pp. 1-5.
Hami-Eddine et al. (2015) "A new technique for lithology and fluid content prediction from prestack data: An application to a carbonate reservoir", Interpretation, vol. 3, No. 1, pp. S19-S32.
He et al. (2016) "Deep Residual Learning for Image Recognition," *2016 IEEE Conference on Computer Vision and Pattern Recognition (CVPR)*, pp. 770-778.
Hesthaven et al. (2007), "Nodal Discontinuous Galerkin Methods: Algorithms, Analysis, and Applications", *Springer, Texts in Applied Mathematics*, pp. 19-41.
Huang et al. (2017) "A scalable deep learning platform for identifying geologic features from seismic attributes", *The Leading Edge*, vol. 36, pp. 249-256.
Isola et al. (2018) "Image-to-Image Translation with Conditional Adversarial Networks", *2017 IEEE Conference on Computer Vision and Pattern Recognition*, pp. 5967-5976.
Janoos et al. (2014) "Multi-scale graphical models for spatio-temporal processes", *Advances in Neural Information Processing Systems*, vol. 27, pp. 316-324.
Jianq et al. (2016) "Detecting prospective structures in volumetric geo-seismic data using deep convolutional neural networks," Poster presented at the annual foundation council meeting of the Bonn-Aachen International Center for Information Technology (b-it), p. 1.
Ying Jiang (2017) "*Detecting Geological Structures in Seismic Volumes Using Deep Convolutional Neural Networks*", Master Thesis from Rheinish-Westfalische Technische Hochschule Aachen, p. 1-76.
Kingma et al. (2015) "*Adam: A Method for Stochastic Optimization,*" *ICLR-Conference Paper*, pp. 1-15.
Koenderink et al. (1994) "Two-plus-one-Dimensional differential geometry," *Pattern Recognition Letters*, vol. 15, pp. 439-443.
Komatitsch et al. (2000) "The spectral element method for three-dimensional seismic wave propagation" *SEG Technical Program Expanded Abstracts*, pp. 2197-2200.
Krizhevsky et al. (2012) "ImageNet classification with deep convolution neural networks", *NIPS*, pp. 1-9.
LeCun, Y. (2015) "Deep Learning," *Nature*, vol. 521, pp. 436-444.

(56) References Cited

OTHER PUBLICATIONS

Lewis et al. (2017) "Deep learning prior models from seismic images for full-waveform inversion", *SEG Technical Program Expanded Abstracts*, pp. 1512-1517.
Leveque, R. J. (2002) "Finite volume methods for hyperbolic problems", Cambridge Texts in Applied Mathematics, Cambridge University Press, pp. 64-85.
Li et al. (2015) "Gravity and magnetic methods in mineral and oil & gas exploration and production", *EAGE*, pp. 15-24.
Lin et al. (2013) "A wavelet-based model compression method for three-dimensional electromagnetic data inversion", *SEG Houston 2013 Annual Meeting*, pp. 707-712.
Lin et al. (2017) "Building Subsurface Velocity Models with Sharp Interfaces Using Interface-Guided Seismic Full-Waveform Inversion", *Proceedings: Thirty-Ninth Workshop on Geothermal Reservoir Engineering*, pp. 1-8.
Lines et al. (2004) "Fundamentals of Geophysical Interpretation", Chapter 15, Geophysical Monograph Series, Society of Exploration Geophysicists, pp. 137-144.
Lines et al. (2004) "Fundamentals of Geophysical Interpretation", Chapter 16, Geophysical Monograph Series, Society of Exploration Geophysicists, pp. 145-158.
Lines et al. (2004) "Fundamentals of Geophysical Interpretation", Chapter 17, Geophysical Monograph Series, Society of Exploration Geophysicists, pp. 159-170.
Lines et al. (2004) "Fundamentals of Geophysical Interpretation", Chapter 18, Geophysical Monograph Series, Society of Exploration Geophysicists, pp. 171-180.
Long et al. (2015) "Fully Convolutional Networks for Semantic Segmentation," *Proceedings of the IEEE Computer Society Conference on Computer Vision and Pattern Recognition*, pp. 3431-3440.
Ma et al. (2012) "Image-guided sparse-model full waveform inversion", *Geophysics*, vol. 77, pp. R189-R198.
Macias et al. (2000) "Artificial neural networks for parameter estimation in geophysics", *Geophysical Prospecting*, vol. 48, pp. 21-47.
Marroquin et al. (2009) "A visual data-mining methodology for seismic facies analysis: Part 1—testing and comparison with other unsupervised clustering methods", *Geophysics*, vol. 74, p. P1-P11.
Miller et al. (2001) "Seismic interpretation and processing applications", *Handbook of Geophysical Exploration*, pp. 101-118.
Moczo et al. (2007) "The finite-difference time-domain method for modeling of seismic wave propagation", *Advances in Geophysics*, vol. 48, pp. 421-516.
Mun et al. (2017) "Comparison of objective functions in CNN-based prostate magnetic resonance image segmentation", *2017 IEEE International Conference on Image Processing (ICIIP)*, pp. 3859-3863.
Nocedal et al. (2006) "Numerical optimization", *Springer Series in Operations Research and Financial Engineering*, pp. 10-29.
D. Oldenburg (1990) "Inversion of electromagnetic data: An overview of new techniques", *Surveys in Geophysics*, vol. 11 pp. 231-270.
*PaleoScan Software* available from Eliis, http://www.eliis.fr/products/paleoscan-software, downloaded Jul. 3, 2018, p. 1-2.
G. Partyka, (2017) "Seismic processing and analysis in service of interpretation", *SEG Technical Program Expanded Abstracts*, pp. 5261-5266.
Regone et al. (2017) "Geologic model building in SEAM Phase II—Land seismic challenges", The Leading Edge, pp. 738-749.
Ronneberger et al. (2015) "U-Net: Convolutional Networks for Biomedical Image Segmentation," *Medical Image Computing and Computer-Assisted Intervention (MICCAI)*, Springer, LNCS, vol. 9351, pp. 234-241.
Roth et al. (1994), "Neural networks and inversion of seismic data", Journal of Geophysical Research, vol. 99, pp. 6753-6768.
Sava et al. (2009) "Overview and classification of wavefield seismic imaging methods" *The Leading Edge*, vol. 28, pp. 170-183.
Schaefer et al. (2006) "Image deformation using moving least squares", *ACM Transactions on Graphics* vol. 25, pp. 533-540.
Schiesser (1991) "A PDE Second-Order in Time: The Hyperbolic Wave Equation", *The Numerical Method of Lines: Integration of Partial Differential Equations*, pp. 70-75.
Schiesser (1991) "Spatial Differentiation", *The Numerical Method of Lines: Integration of Partial Differential Equations*, pp. 97-122.
Simonyan, K. (2015) "Very Deep Convolutional Networks for Large-Scale Image Recognition," *ICLR 2015 Conference Paper*, pp. 1-15.
T. Smith (2017) "Geobody interpretation through multiattribute surveys, natural clusters and machine learning", *SEG International Exposition and 87th Annual Meeting*, pp. 2153-2157.
Srivastava et al. (2014) "Dropout: A simple way to prevent neural networks from overfitting", *Journal of Machine Learning Research*, vol. 15, pp. 1929-1958.
Tarantola (2005) "Inverse problem theory and methods for model parameter estimation: Chapter 3 The Least-Squares Criterion", *SIAM* pp. 57-64.
Tschannen et al. (2017) "Facies classification from well logs using an inception convolutional network" XP080767099.
Virieux et al. (2009) "An overview of full-waveform inversion in exploration geophysics", *Geophysics*, vol. 74, pp. WCC1-WCC26.
Veillard et al. (2018) "Fast 3D Seismic Interpretation with Unsupervised Deep Learning: Application to a Potash Network in the North Sea", *80th EAGE Conference & Exhibition*, pp. 1-5.
Waideland et al. (2018) "Convolutional neural networks for automated seismic interpretation", *The Leading Edge*, pp. 529-537.
Wang et al. (2008) "Advances in velocity model-building technology for subsalt imaging", *Geophysics*, vol. 73, pp. VE173-VE181.
Yilmaz (2001) "Seismic data analysis: Processing, inversion, and interpretation of seismic data", Investigations in Geophysics, Society of Exploration Geophysicists, pp. 463-476.
Zamir et al. (2018) "Taskonomy: Disentangling Task Transfer Learning", *Proceedings of the IEEE Conference on Computer Vision an Pattern Recognition*, pp. 3712-3722.
Zhang (2008) "Incorporating Geological Conceptual Models and Interpretations into Reservoir Modeling Using Multiple-Point Geostatistics", *Earth Science Frontiers*, vol. 15, pp. 26-35.
Zhang et al. (2016) "Automated Geophysical Feature Detection with Deep Learning," *GPU Technology Conference*, pp. 1-22.
Zhu et al. (2017) "Toward Multimodal Image-to-Image Translation", *31st Conference on Neural Information Processing Systems*, pp. 1-12.
Zou et al. (2004) "Statistical validation of image segmentation quality based on a spatial overlap index", *Academy of Radiology*, vol. 11, pp. 178-189.

* cited by examiner

AUTOMATED RESERVOIR MODELING USING DEEP GENERATIVE NETWORKS

CROSS-REFERENCE TO RELATED APPLICATIONS

This application claims the benefit of U.S. Provisional Application 62/878,981, filed Jul. 26, 2019, entitled "Automated Reservoir Modeling Using Deep Generative Networks"; of U.S. Provisional Application 62/826,095, filed Mar. 29, 2019, entitled "Data Augmentation for Seismic Interpretation Systems and Methods," and of U.S. Provisional Application 62/777,941, filed Dec. 11, 2018, entitled "Automated Seismic Interpretation-Guided Inversion"; and the entirety of which are incorporated by reference herein.

TECHNICAL FIELD

This disclosure relates generally to the field of geophysical prospecting and, more particularly, to seismic prospecting for hydrocarbon management and related data processing. Specifically, exemplary implementations relate to methods and apparatus for generating geological models with machine learning.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

The upstream oil and gas industry explores and extracts hydrocarbons in geological reservoirs which are typically found thousands of meters below the Earth's surface. Various types of geophysical and geological data are available to characterize the subsurface, including seismic data, well logs, petrophysical data, geomechanical data. In addition, various geological concepts, including environment of depositions (e.g., channel or turbidities complexes, etc.) are available. Further, various reservoir stratigraphic configurations, such as the number of channels, channel thicknesses, etc., may be inferred. The geophysical data, the geological concepts, and the reservoir stratigraphic configurations may be used to generate a reservoir model (or interpret one or more stratigraphic features), which in turn may be used to infer the values of their geological properties (e.g., Vshale, porosity, net-to-gross, etc.). These maps (or images) are then examined and interpreted with a goal of identifying geologic formations that may contain hydrocarbons (e.g., those formations are often referred as prospects when certain criteria are met). The geologic details within those prospects may delineate reservoirs and fluid contacts (e.g., contact surfaces between water and oil legs) and may also be used for planning reservoir depletion (including enhanced oil recovery (EOR)) and management.

Reservoir modeling (and stratigraphic interpretation) involves constructing a digital representation of hydrocarbon reservoirs or prospects that are geologically consistent with all available information. The available information typically include: a structural framework extracted from the seismic data (e.g., horizons, faults and boundaries describing a geobody or geobodies containing hydrocarbons); internal architecture (e.g., depositional facies or sequences); well logs; petrophysics; and geological concepts associated with the environment of deposition (EOD). Geologic concepts (also interchangeably referred to as conceptual geological templates) and prior subsurface knowledge play an important role in reservoir modeling (and stratigraphic interpretation) when geologists and reservoir modelers attempt to predict the spatial heterogeneity of geological formations between wells based on available sparse or incomplete data in 3D. Examples of the geological concepts (or EODs) are fluvial depositional systems, such as meandering or braided channel systems or turbidities.

Thus, 3D seismic provides a structural framework to extrapolate the spatial distribution of lithology and petrophysical properties beyond an appraisal (or analog) well locations. A set of key seismic information used in reservoir modeling is illustrated in diagram 100 of FIG. 1. The information flow from seismic (and other geophysical data) to reservoir modeling may be as follows:

(i) seismic data 110 is processed to generate a geophysical model 120, which may define one or more geophysical properties (e.g., compressional and shear wave velocities, density, anisotropy and attenuation) of the subsurface.

(ii) subsurface images, such as seismic images 130, are constructed, typically using the seismic reflection events and the inverted geophysical models (e.g., velocity model) to migrate the events from surface locations to their subsurface locations. These images describe the reflectivity of subsurface boundaries between formations.

(iii) petrophysical properties, such as reservoir properties 150 (e.g., porosity, permeability, and lithology), of the prospects are estimated from the geophysical models, images and empirical petrophysical models (or rock physics model) along with available log data (appraisal or analog wells).

(iv) all information is integrated with a reservoir framework 140, geologic concepts, such as EODs, to build one or more plausible reservoir models 160. The properties in these reservoir models may be populated through geostatistical (e.g., kriging) or deterministic approaches, which may be based on computational stratigraphy such as depositional process simulations. The process based geologic simulations may be described by physical laws that govern the transportation of source materials, the deposition and compaction of rocks, and their erosion. Reservoir geomechanics and tectonics (e.g., faulting, folding, unfaulting, unfolding or flattening) are also considered during this process.

The constructed reservoir models may be later conditioned 170 to comply with seismic data by adjusting their geological parameters or reservoir stratigraphic configurations (e.g., thicknesses of the channels, number of channels stacked in the reservoir, and channel paths). Seismic conditioning is complicated due to the manual adjustment of the geological parameters, complexity of reservoir models, workflows, and cycle time.

An example reservoir modeling workflow 200 is illustrated in FIG. 2. First, at 210, reservoir surfaces such as faults and horizons corresponding to the interfaces of different formations (also corresponding to the instantaneous record of geological time) are interpreted. Then, at 220, a watertight framework is obtained by determining the point of contact between horizons and the faults and intersecting them. Thereafter, at 230, the horizons are unfaulted and unfolded to an isochronal geologic state which corresponds to the geologic horizon of the same age. Next, at 240, the horizons become useful for stratigraphic modeling, such as interpreting stratigraphic features. Depending on the geologic concepts associated with EODs (e.g., confined channel systems), stratigraphic details conforming to the isochronal horizons are filled in. At 250, the stratigraphic model in the isochronal state are deformed through folding and faulting processes to return to the current reservoir state or configuration, which is referred as the geological model, such as the reservoir model. In the exploration stage, stratigraphic interpretation is used to create a geologic realization (which is often coarse and less detailed due to the lack of information which are available during development and production stages) of the target subsurface section similar to reservoir modeling with less information. Hereafter, stratigraphic models may be referred to as the reservoir models as well.

In this regard, stratigraphic interpretation and reservoir modeling are a laborious, subjective, inconsistent and multi-disciplinary series of tasks, often leading to a suboptimal integration of all available information.

SUMMARY

A machine learning method for generating one or more geological models of a subsurface is disclosed. The method includes: accessing conditioning data related to the subsurface; accessing one or more geological concepts related to a target subsurface; accessing one or more input geological models of the subsurface; training machine learning model using the conditioning data, the one or more geological concepts, and the one or more input geological models; and generating, based on the machine learning model, one or more geological models with new conditioning data.

DESCRIPTION OF THE FIGURES

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

DETAILED DESCRIPTION

Figure 1:
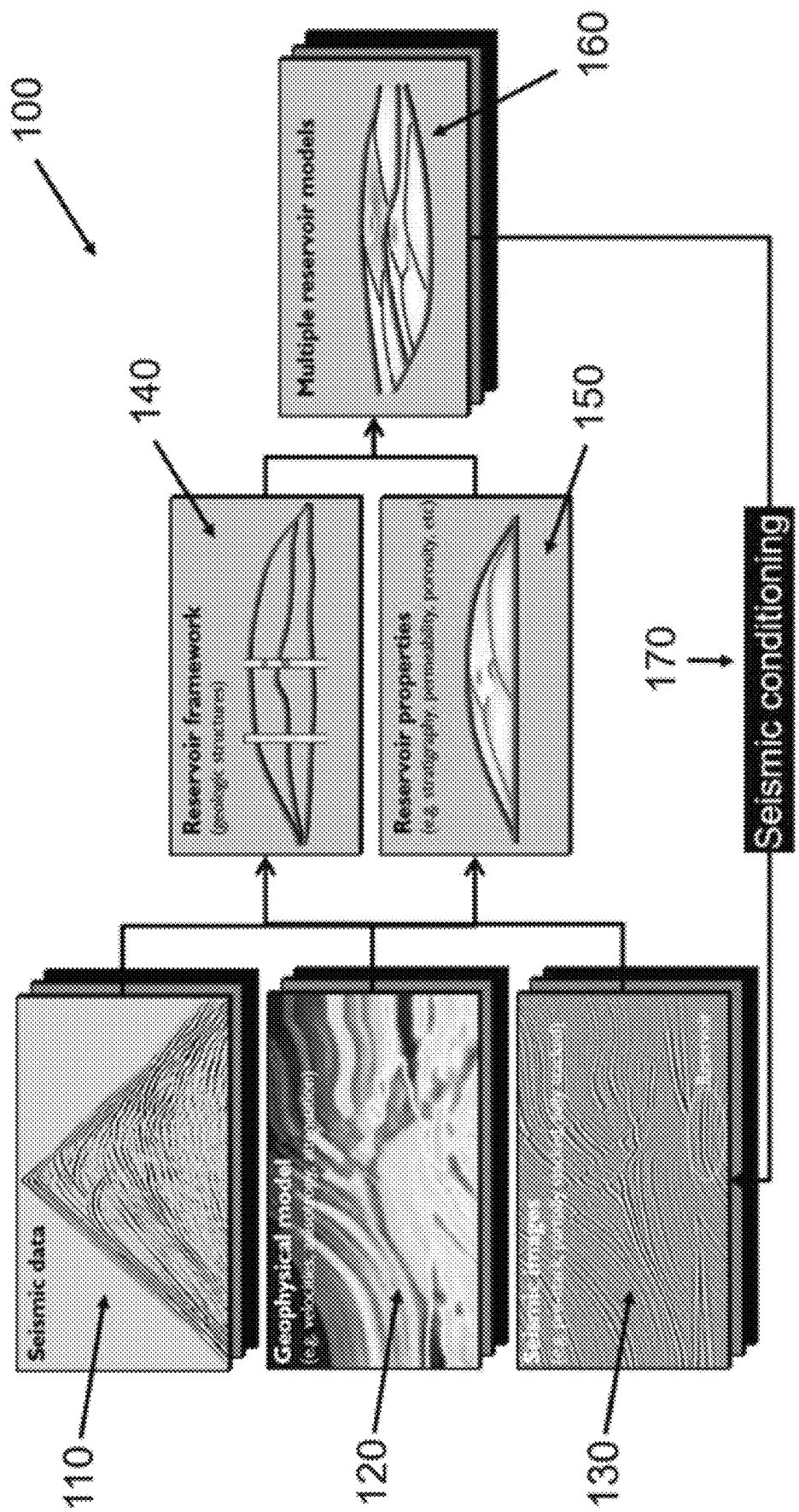
FIG. 1 is a flow diagram from seismic to simulations for building reservoir models.
Figure 2:
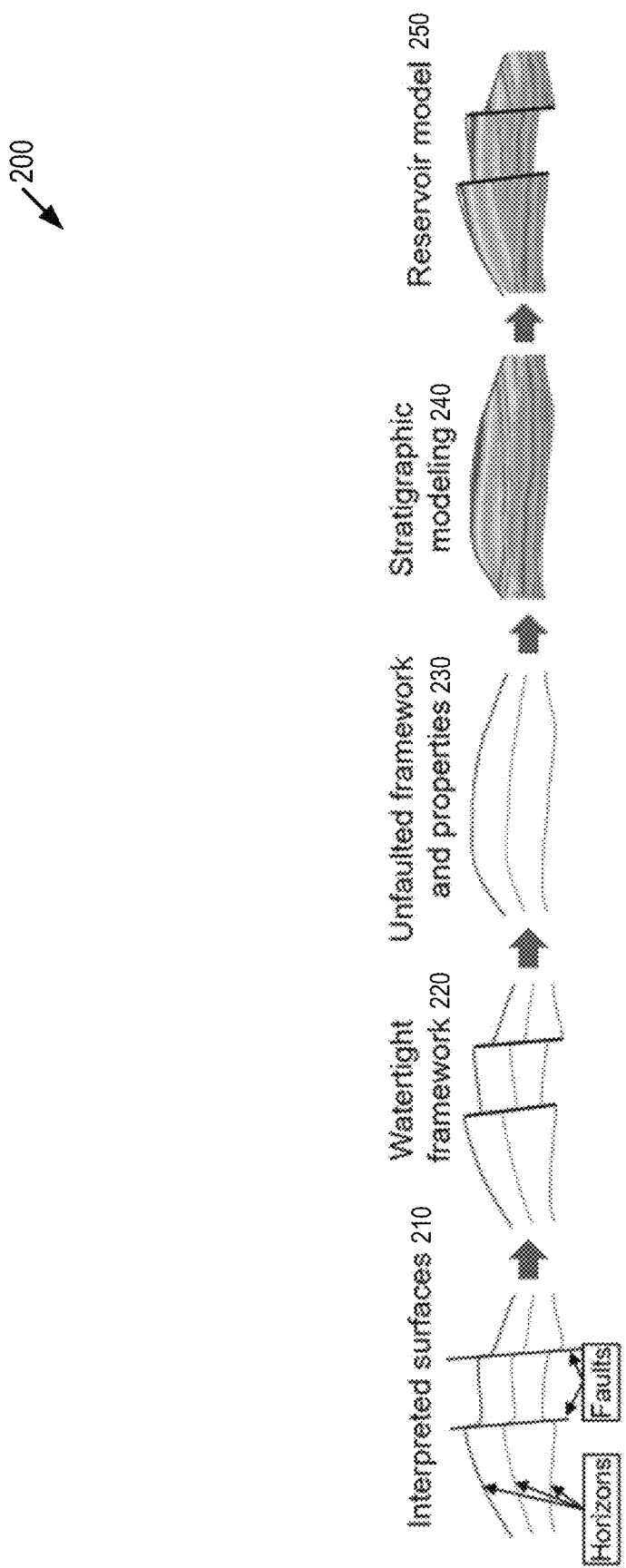
FIG. 2 is an example reservoir modeling workflow.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying process, including particle displacement, velocity and/or acceleration, pressure and/or rotation, wave reflection, and/or refraction data. "Seismic data" is also intended to include any data (e.g., seismic image, migration image, reverse-time migration image, pre-stack image, partially-stack image, full-stack image, post-stack image or seismic attribute image) or properties, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic; gravity plus electromagnetic plus seismic data, etc. For example, joint-inversion utilizes multiple geophysical data types.

The terms "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which is ray paths obeying Snell's law can be traced. A 3-D geologic model (particularly a model represented in image form) may be represented in volume elements (voxels), in a similar way that a photograph (or 2-D geologic model) is represented by picture elements (pixels). Such numerical representations may be shape-based or functional forms in addition to, or in lieu of, cell-based numerical representations.

Subsurface model is a model (or map) associated with the physical properties of the subsurface (e.g., geophysical or petrophysical models)

Geophysical model is a model associated the geophysical properties of the subsurface (e.g., wave speed or velocity, density, attenuation, anisotropy).

Petrophysical model is a model associated the petrophysical properties of the subsurface (e.g., saturation, porosity, permeability, transmissibility, tortuosity).

Geophysical data is the data probing the geophysical properties of the subsurface (e.g., seismic, electromagnetic, gravity).

Geological model is a spatial representation of the distribution of sediments and rocks (rock types) in the subsurface.

Reservoir model is a geological model of the reservoir.

Stratigraphic model is a spatial representation of the sequences of sediment and rocks (rock types) in the subsurface.

Reservoir (structural) framework is the structural analysis of reservoir based on the interpretation of 2D or 3D seismic images. For examples, reservoir framework comprises horizons, faults and surfaces inferred from seismic at a reservoir section.

Conditioning data refers a collection of data or dataset to constraint, infer or determine one or more reservoir or stratigraphic models. Conditioning data might include geophysical models, petrophysical models, seismic images (e.g., fully-stacked, partially-stacked or pre-stack migration images), well log data, production data and reservoir structural framework.

Machine learning is a method of data analysis to build mathematical models based on sample data, known as training data, in order to make predictions and or decisions without being explicitly programmed to perform the tasks.

Machine learning model is the mathematical representation of a process, function, distribution or measures, which includes parameters determined through a training procedure.

Generative network model (also referred as a generative network to avoid the ambiguity with subsurface models) is an artificial network that seeks to learn/model the true distribution of a dataset giving it the ability to generate new outputs that fit the learned distribution.

Parameters of (generative or discriminator) network are weights or parameters of the neural or convolutional networks, which may be determined through training process.

Hyper-parameters of network are the parameters defining the architecture of the network/model (e.g., number of filters in the convolutional neural networks, number of layers, convolutional filter sizes), the parameters defining training process (e.g., learning rate), which may be determined manually or using a reinforcement learning or Bayesian optimization method.

Training (machine learning) is typically an iterative process of adjusting the parameters of a neural network to minimize a loss function which may be based on an analytical function (e.g., binary cross entropy) or based on a neural network (e.g., discriminator).

Objective function (a more general term for loss function) is a measure of the performance of a machine learning model on the training data (e.g., binary-cross entropy), and the training process seeks to either minimize or maximize the value of this function.

Adversarial training process for generative networks is a training process where the overall objective function that is being minimized or maximized includes a term related to the objective function of an adversary, also termed a discriminator. In this process both the generator and discriminator are typically trained alongside each other.

Generative Adversarial Network (GAN) is an artificial network system including generator (or interpreter) and discriminator network used for training the generative network model.

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, a "gather" refers to a display of seismic traces that share an acquisition parameter. For example, a common midpoint gather contains traces having a common midpoint, while a common shot gather contains traces having a common shot.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed above, understanding the subsurface and the fluids therein is important to all stages of the upstream workflows. There are two approaches to improving the understanding of the subsurface including: (1) acquiring additional data regarding the subsurface, which may be prohibitively expensive; or (2) better managing the existing data obtained through understanding the range of plausible potential subsurface realities that are consistent with some or all available data. The latter option may be achieved by generating geological models (such as reservoir or stratigraphic models) with varying structural frameworks, reservoir properties, architecture with suitable parametric variations and alternative geologic templates based on environments of depositions (e.g., channel systems, carbonate systems, alluvial systems). In one implementation, the geological models, including reservoir modeling and stratigraphic interpretation methods, are automatically generated based on machine learning, such as deep generative networks.

As discussed above, stratigraphic interpretation and reservoir modeling are labor-intensive and becomes increasingly complex as the complexity of reservoirs and prospects increases. Automating reservoir modeling, which may consider multiple scenarios without sacrificing the geological quality, may augment seismic interpretation and reservoir modeling to develop and manage hydrocarbon reservoirs. For example, sedimentation may vary, leading to different modalities of geologies, with the seismic data (such as the field seismic data) lacking sufficient resolution to definitively indicate a particular modality. Thus, the machine learning may generate a plurality of reservoir models that account for different sedimentation and different modalities of geologies that comport with the seismic data. In this regard, automating reservoir modeling may address one, some or all of the following challenges with typical reservoir modeling methods including: availability of reservoir models for exploration; bias; time-intensive manual process; seismic, geophysical and petrophysical conditioning; and reservoir production history matching.

With regard to the availability of reservoir models for exploration, exploration decisions are typically made with rudimentary assumptions regarding reservoir geology, which may be based on geologists' sketches. Because stratigraphic analysis is a laborious task and has been difficult to translate into computer instructions to automate the process, only one stratigraphic model is usually provided to make decisions without fully understanding uncertainties associated with reservoir geology. Automatically generating a set of plausible realizations (such as an ensemble) of reservoir models via machine learning during one or more stages of exploration may be valuable in order to make rapid and risk-aware decisions.

With regard to bias, interpretation of stratigraphy and the construction of reservoir models with incomplete and erroneous data may be an idiosyncratic and exhaustive process based on a particular geologist's prior training and experience. This may lead to a biased view on the instantiations of geological scenarios, partially when the geology is complex. Automatically generating reservoir models may alleviate this subjectivity in the process in order to appreciably quantify uncertainty in the generated reservoir models.

With regard to the time-intensive nature of the typical process, stratigraphic interpretation and reservoir model building processes are based on laborious tasks, as discussed above. Automating these processes using machine learning may significantly accelerate exploration, development and recovery of hydrocarbon reservoirs.

With regard to seismic and petrophysical conditioning, the reservoir models are typically created only using interpreted surfaces and geological concepts. Later, these created models are modified to honor seismic and petrophysical data. This serial process of creating the models and thereafter modifying the models to comport with the available data presents a challenge because the parameters manipulating these models are manually determined, discontinuous and highly nonlinear. Integrating the creation of the reservoir models and the comportment with the seismic and petrophysical data may eliminate these additional conditioning tasks.

With regard to reservoir production history matching, in the presence of production data, scenario-based reservoir models are recalibrated with the production data to narrow the range of parameters in each scenario or eliminate impractical ones. However, because the number of uncertain reservoir parameters are usually large and nonlinearly related (e.g., any one parameter may depend on the value of the others), typical workflows, which depend on manually or assisted history matching approaches, are lacking. In contrast, machine learning may automatically generate multiple potential reservoir modes conditioned with the production data along with all the prior data.

Thus, in some implementations, machine learning generates one or more geological models, such as one or more reservoir models or one or more stratigraphic models that are consistent with applicable geological concepts and/or conditioning data (e.g., seismic and other available information useful to infer the plausible reservoir geology). In particular, machine learning may generate reservoir models (or interpret stratigraphy) that are automatically conditioned with any one, any combination, or all of: (1) seismic data; (2) interpreted surfaces; (3) geobodies; (4) petrophysical/rock physics models; (5) reservoir property models; (6) well log data; and (7) geological concepts.

Various types of machine learning methodologies are contemplated, including generative-model-based, image-to-image-translation-based, style-transfer-based, clustering-based, classification-based, or regression-based machine learning. Also, various types of learning paradigms are contemplated, including supervised, semi-supervised, unsupervised, reinforcement, or transfer learning paradigms. As merely one example, a generative adversarial network (GAN) may be used as the machine learning methodology. In one implementation of GAN, two neural networks, including a generative network (which generates candidate reservoir models) and a discriminative network (which evaluates or classifies the candidate reservoir models), contest with each other. Given a training set, such as a collection of previously constructed reservoir models (manually or using existing workflows), the GAN may learn to generate one or more candidate reservoir models, such as a single reservoir model or a plurality of reservoir models. For example, the GAN may generate multiple scenarios of reservoir models based on one or more of: (1) the geological concepts; and (2) structural configurations (e.g., whether a fault is present or not). As discussed further below, the training of the GAN may be unconditioned or unsupervised (e.g., where the model is trained to generate realistic images from scratch, such as by inputting random noise), or conditioned or supervised (e.g., in addition to inputting random noise, the network is given "conditions" to encourage it to create realistic images that are also consistent with some structure, such as structural framework or seismic data or petrophysical data or log data).

The GAN may receive various inputs, such as any one, any combination, or all of: conditioning information; latent code; or noise to generate a realization of the reservoir geology. Further, in one implementation, the GAN may generate the multiple reservoir models using one or more fixed inputs (such as the seismic image) and other varying inputs (such as the latent code and/or the noise).

The generative model may learn a relationship between noises and/or latent codes (if enforced) inputted to the generative model and stratigraphic configurations (e.g., channel thickness in channel system concepts) of a reservoir model outputted by the generative model. This may eliminate an effort required for the state-of-the-art reservoir modeling approaches for the explicit parameterization of stratigraphic configurations (e.g., a parameter controlling a channel thicknesses in the channel system concepts).

In this regard, various inputs to the GAN are contemplated as training sets. According to some embodiments, synthetically-generated geological models (such as synthetically generated reservoir models) and the corresponding simulated or field seismic data and/or the petrophysical data associated with the seismic data may be used as a training set for the GAN. For example, reservoir models, such as existing reservoir models or previously GAN-generated reservoir models, may be conditioned by the GAN to comport with the specific conditions at hand, such as the specific seismic data which may be partially-stacked or pre-stack data, or may be conditioned to honor petrophysical data, log data, and net-to-gross expectations. As another example, the reservoir models input to the GAN for training a generative network need not be conditioned (e.g., cycle GANs which do not require conditioning data paired with the reservoir models). Further, simulation methods (e.g., discretization methods for solving partial differential equations governing a physical phenomenon) may be used to generate synthetic seismic data, and petrophysical models or rock physics models to generate synthetic logs and petrophysical property maps for a given reservoir model. In this way, the reservoir model will automatically be conditioned to the all data simulated. In turn, these synthetically-generated data paired with the reservoir models may be used to train the generative models.

According to the foregoing and/or various other embodiments, stratigraphic sketches and the corresponding simulated or field seismic data and/or the petrophysical data associated with the seismic data may be used as a training set. Stratigraphic sketches may comprise diagrams/models that depict the distribution of lithologies, facies or various rock types related to particular EODs. These sketches may be constructed to convey the spatial distribution of rock types or bulk properties, such as porosity. For example, the location of geologic features of interest, such as channel fill (e.g., potential reservoir rock), may be inferred through integration of interpretation of seismic data when considering observations made from field studies (e.g., outcrops) or analogues. Such geologic features may be portrayed or sketched by a mask capturing a realization of the geological context.

In some embodiments, computational stratigraphy (such as based on sedimentation/transportation laws expressed by partial differential equations) may be used to generate stratigraphic or reservoir models and seismic simulations and/or the petrophysical models may be used to generate seismic and/or petrophysical data associated with those synthetic stratigraphic or reservoir models. Such synthetic reservoir or stratigraphic models along with seismic and petrophysical data may be as a training set. In particular, computational stratigraphy comprises a numerical approach to simulate sediment transport. Using rock physics models, outputs of computational stratigraphy simulations may be converted to maps of geophysical properties, such as velocity and density. These geophysical properties may in turn be used to generate synthetic seismic data. The generative models may thus be trained with these geological models constructed with computational stratigraphy simulations and their synthetic seismic data.

In various embodiments, the generated geological models are analyzed for at least one aspect (e.g., uncertainty). As one example, the generated geological models are analyzed for uncertainty in net-to-gross ratio (e.g., fraction of sand thickness with respect to the total depositional unit thickness at the reservoir section). In particular, uncertainty associated with one or more reservoir models may assist in hydrocarbon exploration, reservoir development and depletion decisions. As another example, the generated geological models are analyzed for uncertainty as to EODs, whereby multiple EOD concepts may be considered (e.g., confined channel system versus weakly confined channel system hypothesis may be tested). This differentiation may have a significant impact to the reservoir geology and fluid in pore space distribution, such as to net-to-gross, and fluid volume and flow, and thus the depletion planning. As discussed further below, generative networks may be used to test these multiple scenarios in the process of generating and discriminating multiple potential reservoir models, giving additional control to test geologic concepts directly from data, thereby markedly improving the value of the various case studies that are typically created to act as an informational aid. For example, during GAN training, a section from the mask volume may be extracted. There may be multiple potential concepts (e.g., different potential geological templates) associated with the extracted section. The instantiations of the reservoir models from these multiple potential concepts in the extracted section may be isolated and input to the GAN along with its conditioning data in order to train the generative network. Such training will enable the generative network to learn reservoir features or patterns that correspond with the particular concept. In this way, the GAN may process different sections of the subsurface in order to analyze the potential universe of geological structures and how they comport with the given data.

Traditionally, a single reservoir model or a very limited set of reservoir models (e.g., high-mid-low reservoir models) are used, providing a very limited ability to quantify uncertainty and forecast variabilities in reservoir performance. In contrast, an automated reservoir modeling methodology conditioned with all available data may assist in characterizing full complexity of the reservoir uncertainty, and may capture scenarios representing the reservoir uncertainty. Various approaches to uncertainty are contemplated, such as a frequentist approach based on a sampling distribution and a Bayesian or probabilistic approaches (sampling methods (e.g., importance sampling), perturbation methods (e.g., local expansion technique), functional-expansion methods (e.g., polynomial chaos expansion), numerical integration methods) estimating the reservoir posterior distribution given a prior distribution of key parameters (e.g., structural variability, geological concepts or a set of learned parameters such as the latent variables learned by a variational autoencoder). Other uncertainty methodologies are contemplated.

Multiple realizations of the reservoir models, which may be generated by the generative network, may thus be used to estimate the statistical distributions of the target reservoir quantities which may include any one, any combination, or all of: net-to-gross; spatial continuity (e.g., reservoir connectivity/heterogeneity measures affecting tortuosity); distribution of dynamic properties affecting fluid flow conditions; or distribution of petrophysical properties.

Figure 3:
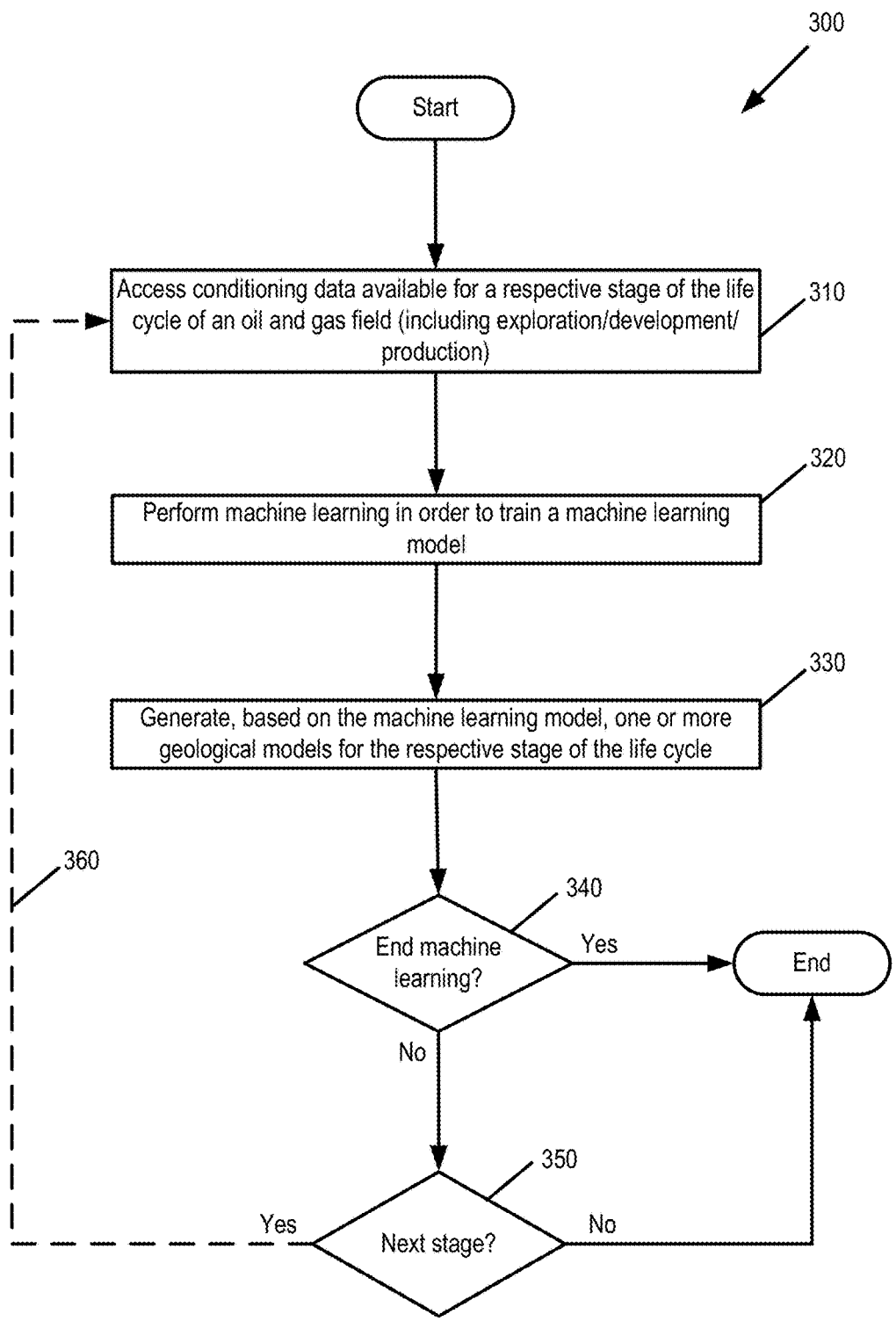
FIG. 3 is a flow diagram for iteratively generating multiple geological models using machine learning.

Referring to the figures, FIG. 3 is a flow diagram 300 for generating multiple geological models using machine learning at one or more stages of the life cycle of oil and gas field (e.g., exploration, development and production). For example, machine learning may be used in any one, any combination, or all of: the petroleum exploration stage; the development stage; or the production stage. Exploration may include any one, any combination, or all of: analysis of geological maps (to identify major sedimentary basins); aerial photography (identify promising landscape formations such as faults or anticlines); or survey methods (e.g., seismic, magnetic, electromagnetic, gravity, gravimetric). For example, the seismic method may be used to identify geological structures and may rely on the differing reflective properties of soundwaves to various rock strata, beneath terrestrial or oceanic surfaces. An energy source transmits a pulse of acoustic or elastic energy into the ground which travels as a wave into the earth. At each point where different geological strata exist, a part of the energy is transmitted down to deeper layers within the earth, while the remainder is reflected back to the surface. The reflected energy may then be sensed by a series of sensitive receivers called geophones or seismometers on land, or hydrophones submerged in water. Similarly, additional data may be generated in each of the subsequent stages of exploration; development (e.g., new densely-acquired broadband 3D seismic, well logs) or production (e.g., 4D or time-lapse seismic for monitoring reservoir).

At 310, various conditioning data, available for a respective stage of the life cycle of an oil and gas field and for use as input to the generative network, may be accessed. The life cycle of the oil and gas field may include any one, any combination, or all of: exploration; development; or production. As discussed above, various types of geophysical data (e.g., seismic data), various geological concepts (e.g., reservoir geological concepts, EODs or other concepts derived from experience or from the data), a set of interpreted surfaces (e.g., horizons or faults) or zones (e.g., strata, anticline structure and reservoir section), and various reservoir stratigraphic configurations (e.g., lithofacies learned from the well logs) may be used. In some or all embodiments, all of the available conditioning data relevant to the reservoir (or the target subsurface area) may be the input to a previously trained generative model to generate one or more geological models in the respective stage. For example, in the exploration stage, one, any combination, or all of the following may comprise available conditioning data: seismic images (e.g., measured and/or simulated); geophysical models (e.g., velocity model, density model); petrophysical models (porosity model; permeability model; estimates of sand and shale facies; etc.); structural framework constructed using the interpreted surfaces; and geological concepts (e.g., the identified EOD (or other geological template)). As another example, in the development stage, one, any combination, or all of the following may comprise available conditioning data: all data available in the exploration stage (e.g., exploration data); seismic data generated in the development stage; and well data. As still another example, in the production stage, one, any combination, or all of the following may comprise available inputs: all data available in the exploration stage (e.g., exploration data); all data available in the development stage (e.g., development data); pressure tests; production data; and 4D seismic (see e.g., US Patent Application Publication No. 2018/0120461 A1, incorporated by reference herein in its entirety).

At 320, machine learning is performed using the accessed data in order to train a machine learning model. At 330, one or more geological models for the respective stage of the life cycle are generated based on the machine learning model. At 340, it is determined whether to continue machine learning. If not, flow diagram 300 ends. If not, at 350, it is determined whether to resample the current conditioning or training data or leverage additional conditioning or training data (such as data from a next stage of the life cycle of oil and gas exploration/production) if available. If so, flow diagram 300 loops back to 310 as shown by line 360. Specifically, line 360 is illustrated as a dashed line to indicate that an iterative process of flow diagram 300 for the different stages of the life cycle is optional.

In this regard, the machine learning methodology may generate multiple geological models that comport with applicable geological concepts and with all available conditioning data (including the data informative of geology from the latest stage of exploration, development or production) and geological concepts. In some embodiments, the sequence of blocks 310 and 320 for a respective stage is independent of the sequence of blocks 310 and 320 for other stages of the life cycle of oil and gas field. Specifically, the inputs to block 310 and the machine learning performed at block 320 in order to train the machine learning model for a respective stage is independent of inputs/machine learning for other stages of the life cycle. Alternatively, one or both of the inputs to block 310 or the machine learning performed at block 320 in order to train the machine learning model for a respective stage may be dependent on the inputs and/or machine learning (including the machine learning model in the previous stage) for another stage of the life cycle. As one example, outputs from a previous iteration, such as one or more reservoir models or scenarios, may be used as input for a subsequent iteration. As another example, machine learning performed in a previous iteration, used to train the machine learning model in the previous iteration, may be used in part or in whole for a subsequent iteration (e.g., the generative network trained in a previous iteration may be used as a basis for the generative network in a subsequent iteration). In particular, responsive to acquiring additional data, the system may continue training (or re-training) the existing generative network or expand the existing generative network (e.g., increasing number of filters in a layer or adding new layers) in order to incorporate the additional data. In some embodiments, an existing and previously-trained generative network may be expanded with additional layers and its expanded part may be only trained with the additional data while the previously-trained part of the generative network is fixed (e.g., not trained). This may also be referred as a transfer learning where the previous-learnings are transfer to the new expanded model while new data is incorporated in the generative network. In some embodiments, the expanded generative network can be trained or re-trained as whole (all parameters of the generative network are updated during the training or re-training).

For example, a first sequence of flow diagram 300 (e.g., a first iteration) may be performed responsive to the exploration stage in which a set of applicable geophysical data and a set of applicable geological concepts are used by the machine learning methodology in order to generate the geological models (e.g., a first plurality of reservoir models). In particular, the applicable geological and geophysical data may comprise seismic data generated from exploration surveying and simulated seismic data generated by geological models of sites similar to the current site. Further, the applicable conditioning data may comprise any one, any combination, or all of: the structural framework (e.g., horizons, faults and boundaries describing a geobody or geobodies containing hydrocarbons); internal architecture (e.g., depositional facies or sequences); petrophysical property models (e.g., porosity, permeability, and lithology); or geological concepts associated with the environment of deposition (EOD). The applicable geological concepts may comprise values (or ranges of values) or may comprise different types (e.g., confined channel systems) and may be selected as potentially describing the subsurface based on the current applicable data. Thereafter, responsive to obtaining additional data responsive to reservoir development, an updated set of applicable conditioning data (e.g., second stage data) may be used in addition to the available prior conditioning data from exploration stage by the machine learning methodology in order to generate the geological models (e.g., a second plurality of reservoir models which is different from the first plurality of reservoir models or which are subset of the first plurality of reservoir models because not all of the first plurality models are consistent with the new conditioning data). The updated set of applicable conditioning data may include the additional data obtained during reservoir development phase. Further, the updated set of applicable geological concepts may reflect additional information obtained during development phase, potentially revising the values (or narrowing the ranges of reservoir models or reservoir values) or may comprise different types from the set of applicable geological concepts generated from exploration phase. In this way, responsive to additional information, the inputs to the machine learning methodology may iteratively generate geological models to comport with the latest conditioning data including new geophysical or petrophysical, reservoir framework or well data.

Figure 6A:
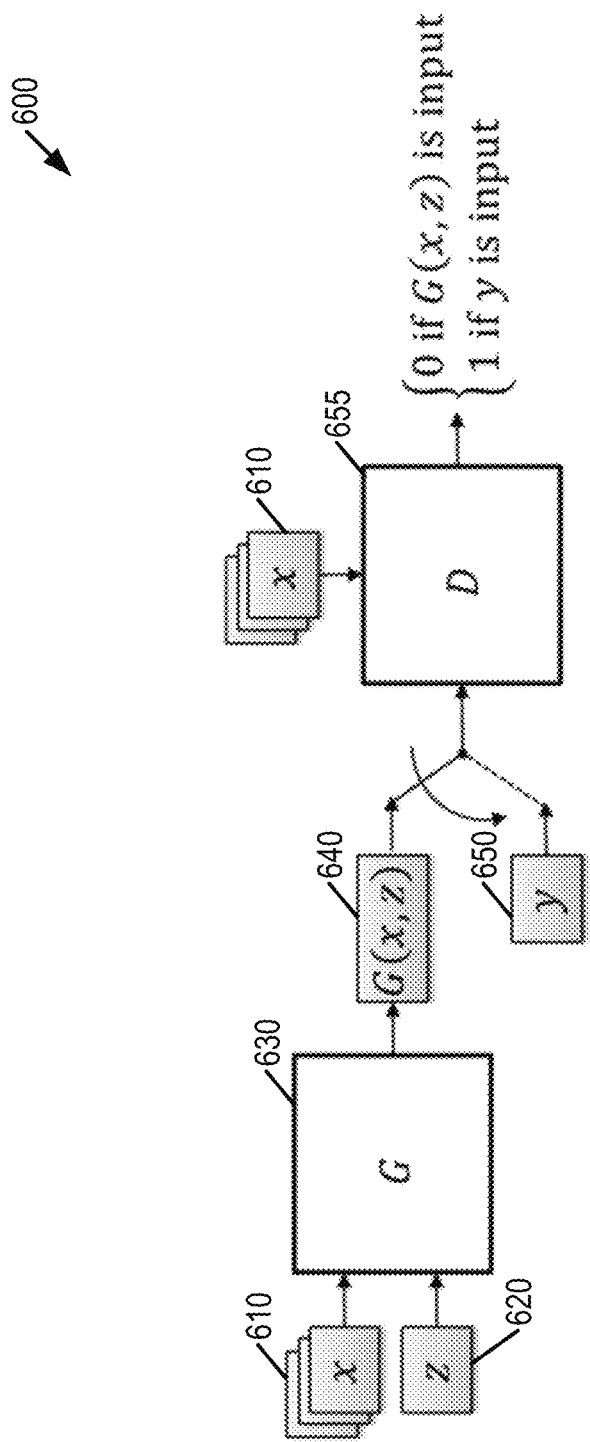
FIG. 6A is a first example block diagram of a conditional generative-adversarial neural network (CGAN) schema.
Figure 6B:
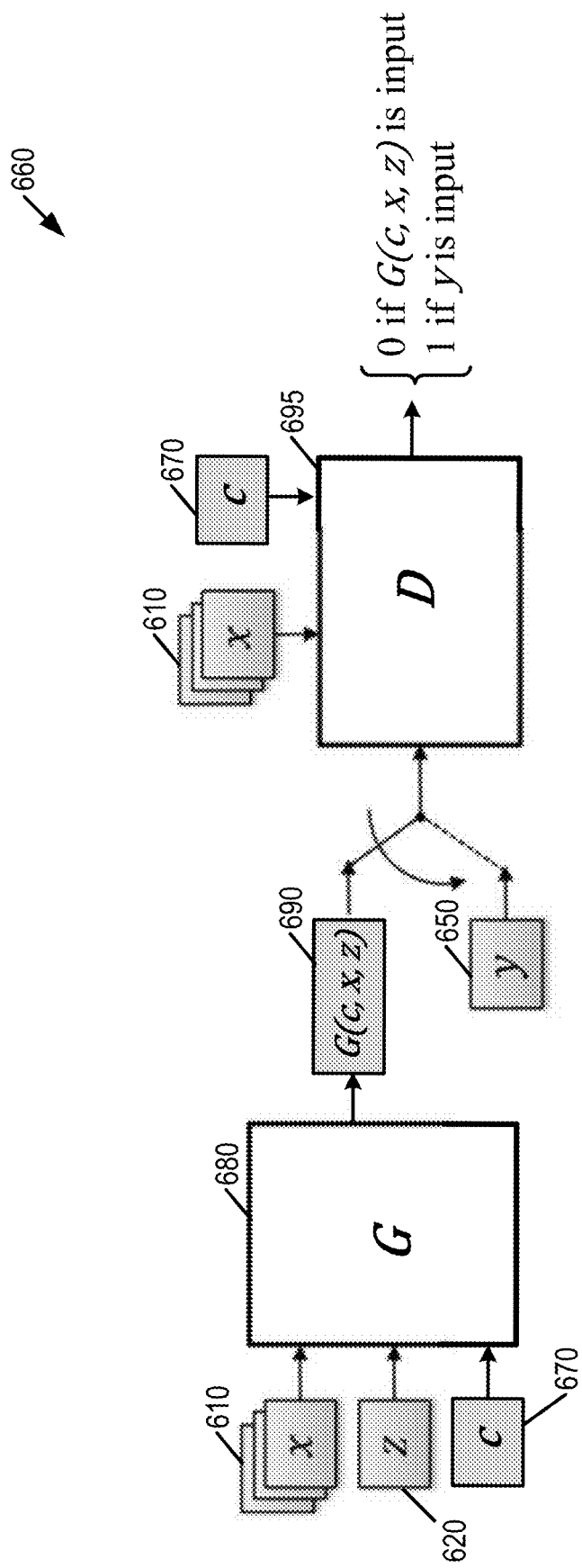
FIG. 6B is a second example block diagram of a CGAN schema.

As discussed above, various machine learning methodologies are contemplated. As one example, a generative adversarial network (GAN) may be used, such as illustrated in FIGS. 6A-B. In this regard, any discussion regarding the application of GAN to generate and/or evaluate geological models may likewise be applied to other machine learning methodologies.

Specifically, FIG. 6A is a first example block diagram 600 of a conditional generative-adversarial neural network (CGAN) schema in which the input to the generative model G (630) is conditioning data (e.g., geophysical data, petrophysical data and structural framework) x (610) and noise z (620). FIG. 6B is a second example block diagram 660 of a CGAN schema in which the input to the generative model G (680) is conditioning data x (610), noise z (620), and latent codes c (670). Other types of GANs are contemplated including deep convolutional GANs (DCGANs), Stacked Generative Adversarial Networks (StackGAN), InfoGANs (an information-theoretic extension to the GAN that is able to learn disentangled representations in an unsupervised manner), Wasserstein GANs (where the loss function is changed to include a Wasserstein distance that correlates to image quality), Discover Cross-Domain Relations with Generative Adversarial Networks (Disco-GANS), or the like. The impact of noise z can also be achieved through intermediate dropout layers within the generative network to induce stochastic behavior to vary the diversity of generated output in models where conditioning data x is provided. The noise distribution may also be learned as a prior distribution using a machine learning process such as a decoder (that learns a mapping from a latent space to the image space) or an autoencoder, or a variational autoencoder (VAE) or VAE-combined GAN(VAEGAN) model.

GANs include generative models that learn mapping from one or more inputs to an output (such as y, G: z→y where y is output (e.g., reservoir model) and z is noise), through an adversarial training process. This is illustrated in FIG. 6A, with generative model G (630) outputting G(x, z) (640) and in FIG. 6B, with generative model G (680) outputting G(c, x, z) (690).

In this training process, two models may be trained simultaneously, including a generative model G (630, 680) and a discriminative model D (655, 695) that learns to distinguish a training output y (also called reference output or ground truth) (650) from an output of generative model G (630, 680). On the other hand, generator G (630, 680) is trained to produce outputs that cannot be distinguished from reference outputs y (650) by discriminator D (655, 695). This competition between G and D networks may converge at a local Nash equilibrium of Game Theory (or GAN convergences when the D and G weights do not change more 1% of its starting weight values; weights are the D and G model parameters which are updated during the training process based on an optimization method such stochastic gradient method), and generative model G learns mapping from noise and input x providing conditions to output y, G: (x, z)→y. Thus, convergence may be defined in one of several ways, including topological convergence.

As shown in FIG. 6A, the generative model G may take x as input, which may include all available conditioning data at an upstream phase, such as multiple seismic images (e.g., pre-stack images), interpreted surfaces, or petrophysical property models, along with a noise array z. Alternatively, the noise array may be accompanied with a latent vector (or code) c, as illustrated in FIG. 6B. The latent code may be used to instruct generative model G (680) to generate outputs (e.g., geological models, such as stratigraphic models or reservoir models) consistent with a particular EOD system. As one example, a set of c values may generate outputs for channel systems and other values of c may result in outputs suited for alluvial EOD systems. As another example, a set of c values may generate a variety of channel complexes (e.g., different numbers of channels, different channel thicknesses, etc.). In this way, a set of c values may be used to perturbate the generative model and further may be used to instruct the generative model to generate models in one or more types of clusters.

In some cases, the use of latent codes may be avoided by training separate generative models, such as each being specialized to generate outputs for a particular EOD. In this regard, multiple generative models (such as illustrated in FIG. 6A) may be used, with each respective generative model associated with a different latent code.

Figure 7:
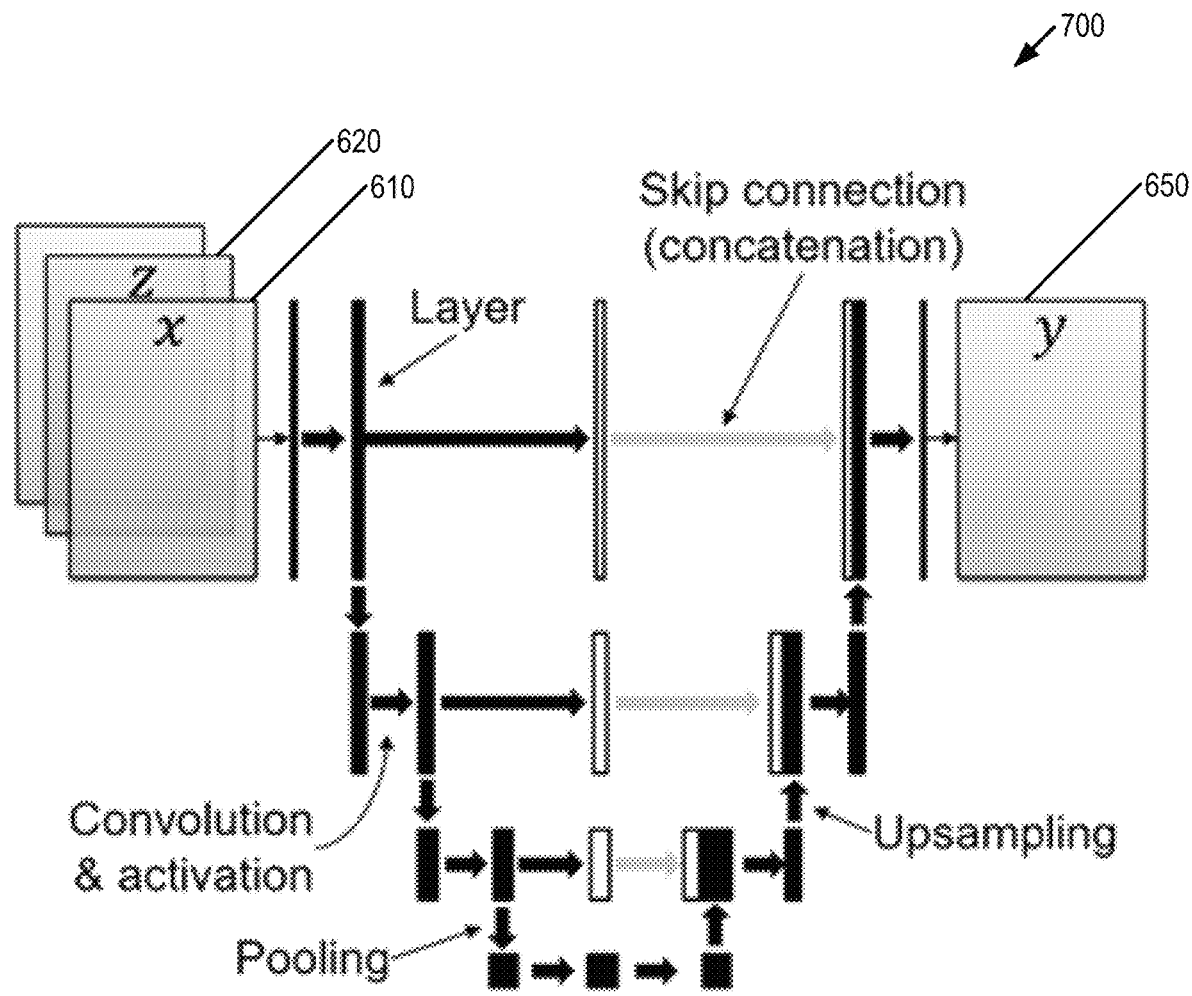
FIG. 7 is block diagram of an architecture of a generative model based on U-net architecture.

The generative model may be based on a deep network, such as U-net, as illustrated in the block diagram 700 of FIG. 7, in which an autoencoder (AE), variational autoencoder (VAE) or any other suitable network maps {x, z, c} to an output of stratigraphic or reservoir model. In cases of AE or VAE, the generative model G may be split into encoder or decoder portions, with the decoder portion being used directly to generate outputs after training is completed. The generative model G may be trained iteratively by solving an optimization problem which may be based on an objective functional involving discriminator D and a measure of reconstruction loss (e.g., an indication of the similarity of the generated data to the ground truth) and/or adversarial loss (e.g., loss related to discriminator being able to discern the difference between the generated data and ground truth).

Various weighting of the reconstruction loss and the adversarial loss are contemplated. In particular, the weight for each of the reconstruction loss and the adversarial loss may typically range between [0,1] where 0 eliminates the impact of that loss altogether during training; however, the respective weight may exceed 1.0. As one example, initially, the reconstruction loss and the adversarial loss may be weighted equally at 1.0. For example: total_loss= (reconstruction_weight*reconstruction_loss)+ (adversarial_weight*adversarial_loss). Thus, the individual losses may be a composite of other loss functions (e.g., the reconstruction loss may be L1 and L2 loss functions together). Further, a loss function measuring the mutual information or a lower bound to the mutual information between code c and reservoir models produced by the G may be used included in the training objective function. A complete formula for the total loss may change between GANs (e.g., the loss formula used for the Conditional GAN may be different from the loss formula used for the Style-GAN or Cycle-GAN).

The weights may be changed dependent on analysis of the training sequence. For example, If during training, it is determined that the discriminator has become too powerful e.g., the generator is unable to generate an output that fools the discriminator), the weight on the adversarial loss may be adjusted.

Thus, the weights may be selected dependent on desired quality of the generated outputs and the learning performance during training, as indicated by the loss function, for both the generator and discriminator networks. For example, in reservoir modeling, there are instances where the goal is to create as realistic of images as possible. In such instances, the weight may be adjusted. In other instances, the goal may be to create diverse scenarios responsive to a specific set of inputs. In such instances where it is desired to create diverse scenarios, the machine learning may be modified in one of several ways. In one way, the reconstruction loss may be reduced so that the generated data does not necessarily need conform perfectly to the input data. In another way, the dropout may be increased. Dropout may range from [0,1], with Dropout==0 resulting in all of the information from the neurons in the network will pass through the model and Dropout==0.5 resulting in a random 50% of the information in the neurons will not pass through that layer of the network. Increasing the dropout may allow for diverse scenario generation since for the same set of inputs, not all of the same information will be sent through the network.

Referring back to the objective function, it may take the form of:

$$F_G(W_G) = \mathbb{E}_{X,Z}[\log(1-D(x,G(W_G;x,z)))] + \lambda \mathbb{E}_{X,Y,Z}[\|y - G(w_G;x,z)\|] \quad (1)$$

where y is one or more reference reservoir model, X, Y, Z are collections of x, y and z inputs respectively, $\mathbb{E}_{X,Z}$ is the expectation of [ ] over all populations of x and z, $W_G$ is the parameters (or weights) of generative model G to be determined by minizing $F_G$, $\lambda$ is the weighting factor between two objectives, and $\| \|$ is a misfit norm such as $L_1$ or $L_2$. If latent code c is used for generating reservoir models, then G function takes the form of $G(W_G; c, x, z)$.

Figure 8:
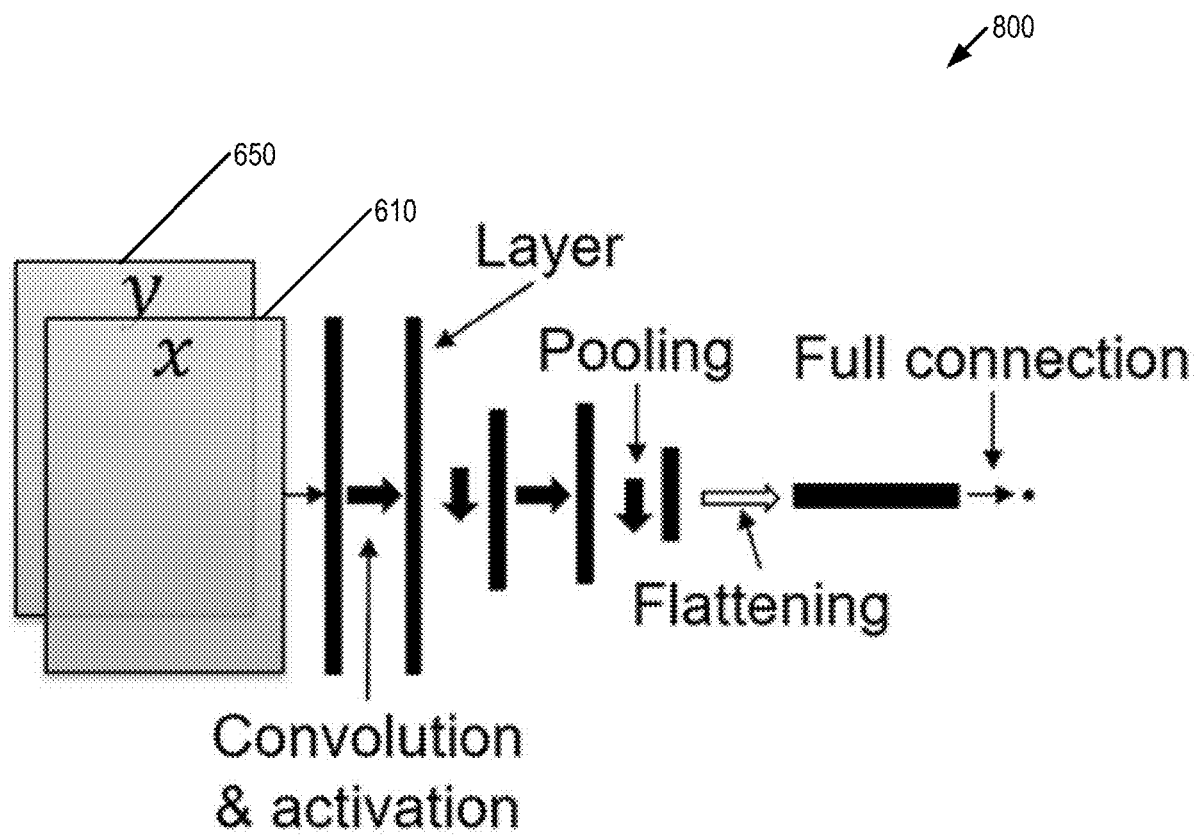
FIG. 8 is block diagram of an architecture of discriminator model which resembles an image classification architecture.

The output of generative model G (e.g., stratigraphic models or reservoir models), samples of reference stratigraphic models or reservoir models y, x and latent code c (if c is inputted to G, such as illustrated in FIG. 6B) may be input to decimator D. In one implementation, the output of D is a scalar typically ranging from 0 to 1 indicating the discriminator's confidence as to whether it has received generated data from G or ground truth data. Discriminator D may be based on a deep network architecture, such as illustrated in the block diagram 800 in FIG. 8. The discriminator D may be trained with an objective functional which may take the form of:

$$F_D(W_D) = \mathbb{E}_y[\log(D(W_D;x,y))] + \mathbb{E}_{x,z}[\log(1-D(W_D;x,G(x,z)))] \quad (2)$$

where, $W_D$ is the parameters of the discriminator to be determined by maximizing $F_D$. If the latent code c is used in generator G, then the D function may take the form of $D(W_D; c, x, y)$ or $D(W_D; c, x, G(x, z))$.

Equations (1) and (2) may be iteratively solved in an alternating fashion by repeating a number of iterations over (1) and then a number of iterations over (2). A combined optimization problem may be expressed as:

$$G^* = \arg_{W_G, W_D} \min_{W_G} \max_{W_D} F_D + F_G \quad (3)$$

Equation (3) may also be augmented with terms regulating parameters of discriminator or generator, $W_D$ or $W_G$, or latent code space c. For instance, a mutuality measure (or a lower bound to the mutuality) between the latent code c and generator output $G(x, z, c)$ may be maximized to relate the latent code c with different output modalities (e.g., a set of c values generates outputs for the channel systems and another set of c values may generate outputs suited for alluvial EOD systems). During the use of trained generators, different modalities of outputs may be constructed by choosing an appropriate latent code. This is discussed further below with regard to multi-scenario generation.

Figure 4:
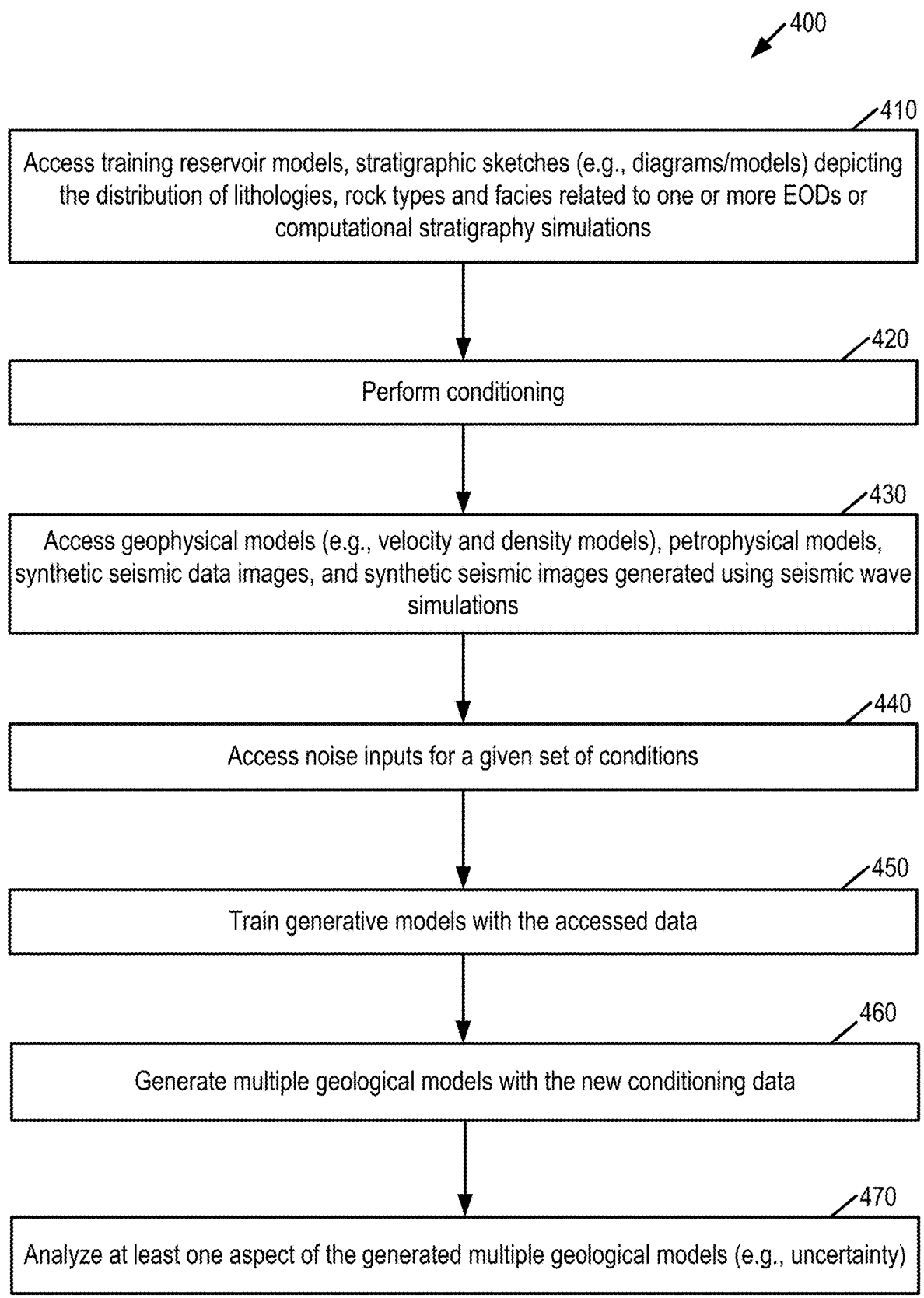
FIG. 4 is a flow diagram for generating geological models using a generative adversarial network.

FIG. 4 is a flow diagram 400 for generating geological models using a GAN. As discussed above, the generative model G may receive various inputs. In this regard, various inputs may be accessed such as any one, any combination, or all of the following: training reservoir models, stratigraphic sketches (e.g., diagrams/models) depicting the distribution of lithologies, rock types and facies related to one or more EODs or synthetic reservoir models produced using computational stratigraphy simulations (410); these models may then be paired with field data or these models may be used to produce conditioning data using synthetic simulators (e.g., seismic wave simulators), (420); geophysical models (e.g., velocity and density models), petrophysical models, seismic images, synthetic seismic images generated using seismic wave simulations (430); and noise inputs for a given set of conditions (440). For example, performing conditioning may comprise generating conditioning data using real or synthetic simulators (e.g., seismic simulator). The synthetically-generated conditioning data may then be supplemented (e.g., using style transfer methods such as Cycle-GAN) with a structured noise to reflect the real data challenges, as discussed further below.

At 450, a generative model is trained using all the accessed data. At 460, the various inputs may be used in order to generate multiple geological models using the trained generative model from 450. And, at 470, the generated multiple geological models may be analyzed for at least one aspect, such as uncertainty.

In some embodiments, synthetically-generated conditioning data (e.g., seismic simulators) at 420 may further be manipulated or augmented with a structured noise to represent challenges in the field data. For example, a style transfer approach (e.g., Cycle-GAN) can learn to translate synthetic data to field data by manipulating the synthetic data style (e.g., frequency distributions) or by adding a noise which has a similar distribution encountered in the field data. A style-transfer approach may be selected from a plurality of style transfer approaches, with the selection of the style-transfer approach being specific to a geological basin, data acquisition type (e.g., marine versus land data acquisition or streamer versus nodal marine acquisitions) or processing workflows to account for the effects which are not modeled with the simulators (e.g., the synthetically-generated conditioning data is generated using one or more simulators, and the style transfer approach is selected to account for the effects not modeled with the one or more simulators).

In one implementation, GANs may generate multiple output realizations depending on one or more inputs, such as with multiple noise inputs for a given set of conditions. In some applications, a dropout strategy may be used during applications of the trained generator in order to generate various output instantiations. Specifically, dropout may randomly deactivate or ignore a certain percentage or set of connections between neurons as data passes through the network.

As discussed above, noise may be input to the generative model G. Use of noise as an input to the generative model G may not be effective to generate multi-scenario models, particularly when the scenarios are expected to illustrate characteristic differences across the realized outputs. In such an instance, a latent code may also be input to the generative model G, whereby the GAN may be trained to maximize the mutual information between the generated outputs and the codes. In one implementation, the latent code space may be structured using a priori knowledge about the application. For instance, the latent code space may comprise various ranges. In particular, generating different instantiations of integer numbers from 1 to 10, one latent code may assume values 1 to 10 corresponding to integers to be generated. For generating multi-scenario reservoir modes, it may be difficult to structure such a latent space. Instead, AE or VAE may be trained in advance to learn a latent space, which may then be used to structure the latent code for generating imperative models and to learn a priori distribution of these latent code space.

Additionally, style transfer methods may be leveraged to generate multi-scenario models. The network designed for style transfer may be trained by incorporating content and style into the loss function. The GAN may attempt to maintain the content of the original scenario while also honoring the style variant that is being applied to the scenario.

Figure 5:
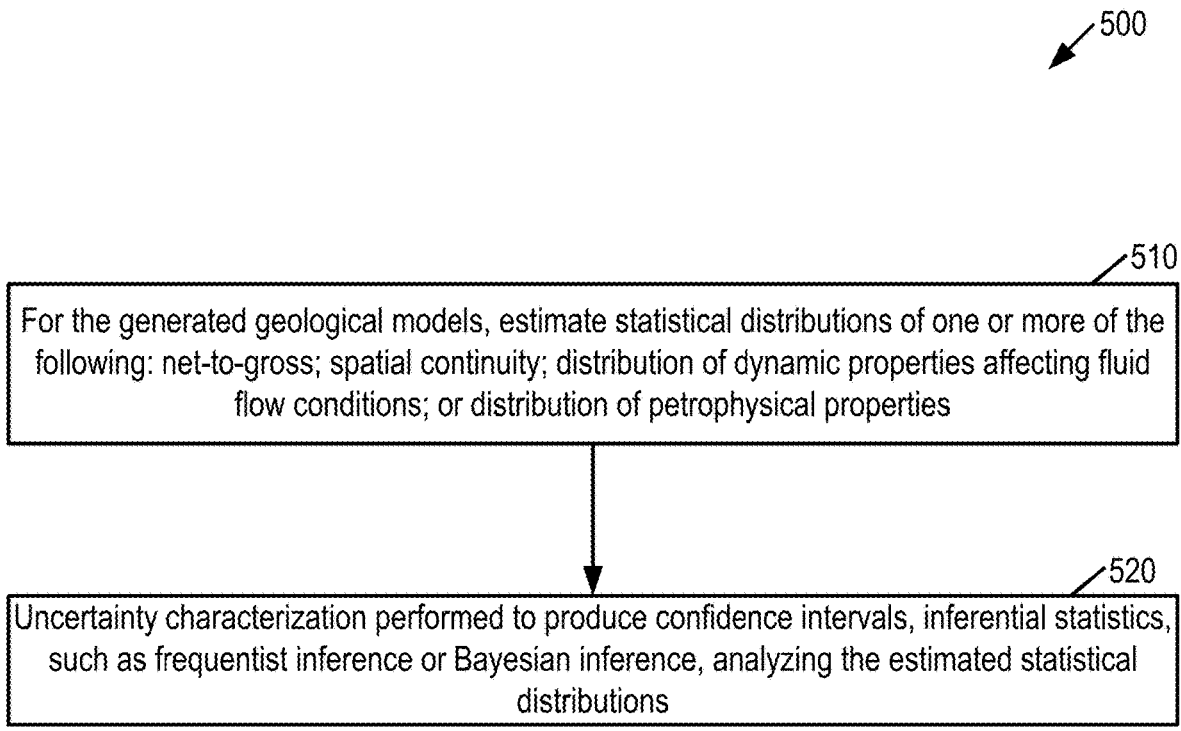
FIG. 5 is a flow diagram for analyzing the generated geological models in order to characterize uncertainty.

As discussed above, the generated geological models may be analyzed for associated uncertainty. Reservoir uncertainty characterization may be computationally feasible by deep generative models, which are computationally effective representation of the reservoir models with a low dimensional latent space. These generative models are fast to instantiate reservoir models and compute the aforementioned target reservoir quantitates. Some of the generative models, such as ones based on VAEs, may inherent the prior distributions of the latent parameters to compute the posterior distributions of the target reservoir quantities of interest. The automated reservoir models discussed herein may use the conditioning information and a set of random latent code and/or noise to generate a realization of the reservoir geology. Further, the conditioning information, such as the seismic image, may be fixed and the only set of variables for generating different reservoir model scenarios may be the latent variables and/or noise. The target reservoir quantities may be calculated based on the reservoir realizations. In certain instances, multi-modal distributions may be characterized by key scenarios and their local statistics representing each modal distribution. In other cases, all possible realizations may be clustered to identify characteristically dissimilar scenarios. Also, reservoir flow simulations including surrogate models based deep network models may use the samples of reservoir models in order to estimate posterior distributions of dynamic reservoir properties or reservoir flow conditions (e.g., oil, gas and water production rates). As such, FIG. 5 is a flow diagram 500 for analyzing the generated geological models in order to characterize uncertainty. At 510, statistical distributions are estimated for the generated geological models based on one or more of the following: net-to-gross; spatial continuity; distribution of dynamic properties affecting fluid flow conditions; or distribution of petrophysical properties. At 520, uncertainty characterization is performed to produce confidence intervals, inferential statistics using a frequentist inference or Bayesian inference, analyzing the estimated statistical distributions.

As discussed above, the disclosed methodology may be applied to a variety of instances. By way of example, the methodology is applied via a synthetic dataset representative of geologic features found in regions of active mountain building, such as sharp topography and alluvial deposits resulting from rapid erosion at the surface, along with complex structures resulting from compressive fold-and-thrust tectonics at depth.

Figure 9:
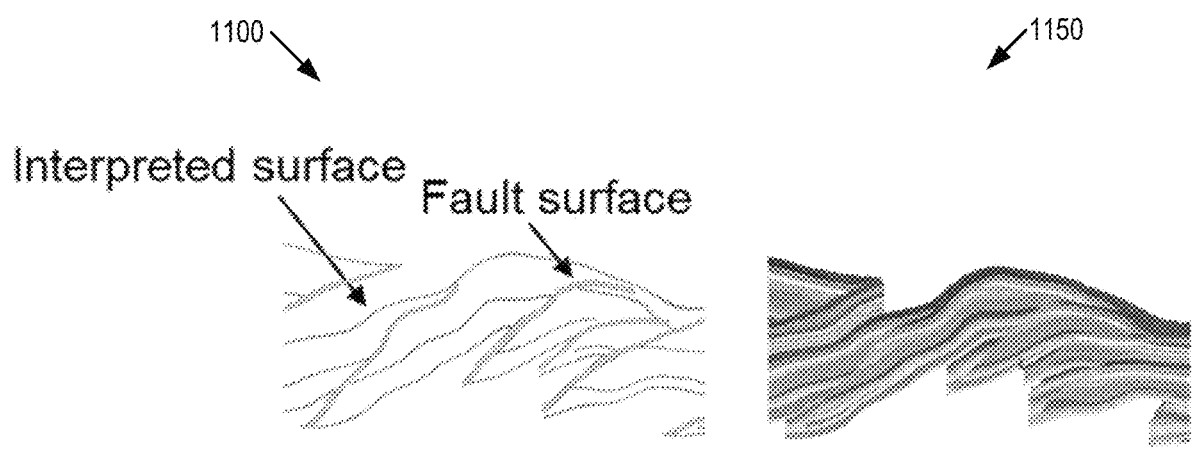
FIG. 9 illustrates a first set of the interpreted surfaces, horizon and fault surfaces and automatically-generated reservoir model using the conditioned generative-adversarial networks trained with the SEAM Foothill geological data.
Figure 11:
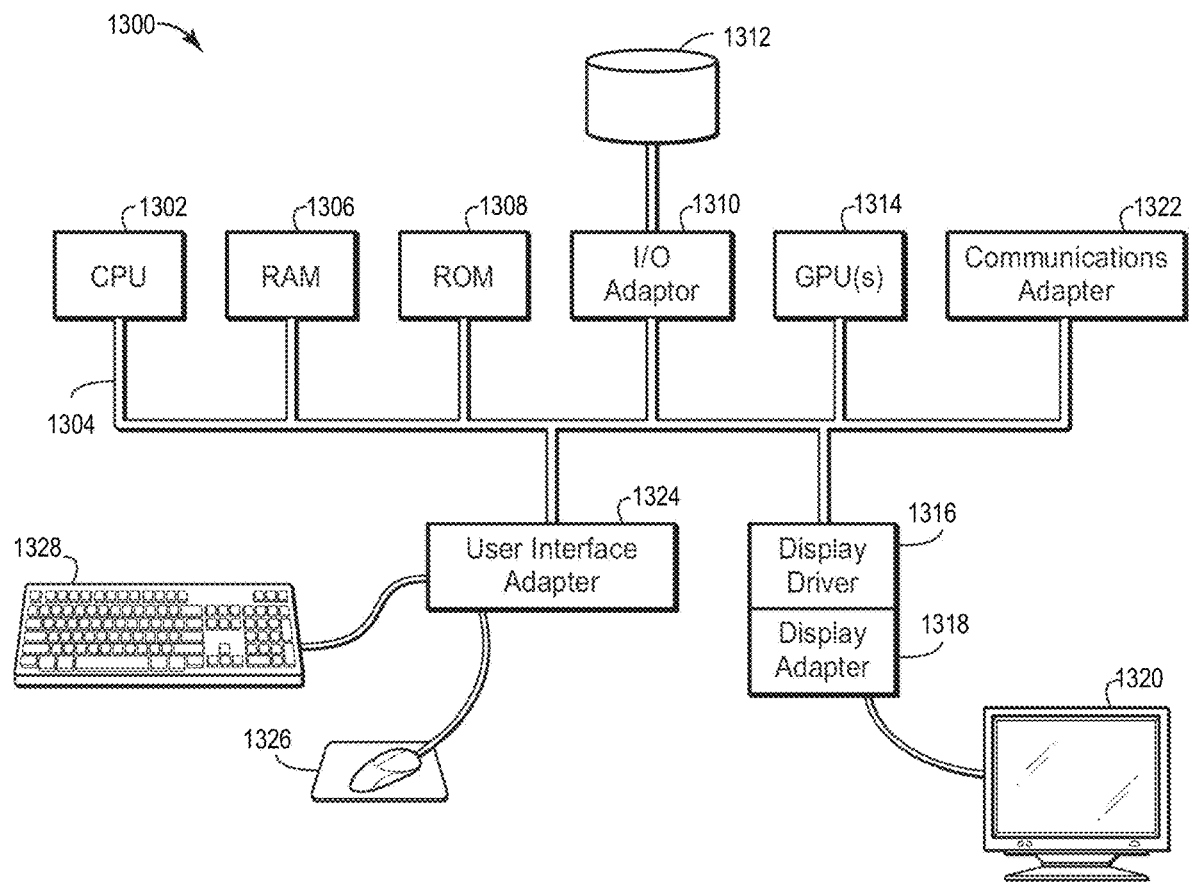
FIG. 11 is a diagram of an exemplary computer system that may be utilized to implement the methods described herein

For illustrations of synthetic data sampled for training the GAN model in accordance with this example, please see FIGS. 9(*b*) and 11(*a*) of C. Regone, J. Stefani, P. Wang, C. Gerea, G. Gonzalez, and M. Oristaglio, *Geologic model building in SEAM Phase II—Land seismic challenges*, The Leading Edge, 2017 (hereafter referred to as "Regone et al. 2017"), which figures are incorporated herein by reference. FIG. 9(*b*) of Regone et al. 2017 is an image of the SEAM (SEG Applied Modeling) Foothills structural framework interpreted from seismic images; and FIG. 11(*a*) of Regone et al. 2017 is an image of a geological model (obtained from its compressional velocity volume) based on the SEAM Foothills geological model (of Regone et al. 2017 FIG. 9(*b*)). FIG. 11(*a*) of Regone et al. 2017 illustrates an instantiation of the geological model based on the structural framework. Per the present example, the structural framework and its seismic image are sampled for training the GAN model. The training outputs may comprise samples of geological models.

The structures in the framework may be uniquely labelled. To generate a variety of training examples, different sections may be extracted, such as extracting a slice of the structural framework so that a top and bottom surface are randomly selected. The geological model may be trimmed at the corresponding locations. This provides the GAN with many different examples of structural combinations. Optionally, data augmentation may be applied in order to recognize other plausible subsurface geometries which are not realized in the model, such as discussed in U.S. Patent Application No. 62/826,095, entitled Data Augmentation For Seismic Interpretation Systems And Methods (attorney reference number 2019EM103), incorporated by reference herein in its entirety. The augmentation strategy may manipulate the reservoir models, structural framework and seismic image samples by applying nonlinear deformations. The structural framework may contain different types of surfaces, such as horizons and faults. When the generative model is introduced with the different types of surfaces, their unique labels may either be removed, maintained, or changed to provide additional context to the model (e.g., fault surfaces may be labelled with a unique descriptor to assist the generator associate discontinuities on the surfaces with the descriptor).

The generative model may process the conditioning data and noise, and output one or more reservoir models with geological details consistent with its training geological concept (e.g., alluvial system) to fill in reservoir framework. The output of the generative model is thus passed to discriminator in order for the discriminator to evaluate its acceptance as a reservoir model. As discussed above, the discriminator is also provided with real reservoir samples extracted from the geological model. The discriminator may therefore attempt to discern which it considers as real and which it considers as fake. At each step of the training, the generator and/or the discriminator have a chance to learn and update their respective models. The generative model accuracy is measured by the training and validation losses along with outputting results throughout the training to inspect visually.

Figure 10:
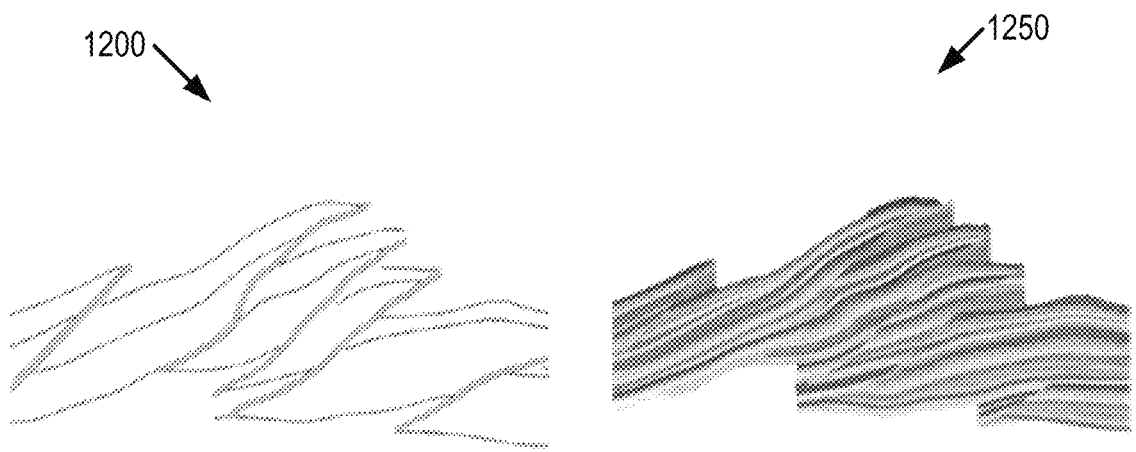
FIG. 10 illustrates a second set of the interpreted surfaces, horizon and fault surfaces and automatically-generated reservoir model using the conditioned generative-adversarial networks trained with the SEAM Foothill geological data.

FIGS. 9 and 10 illustrate respective sets of the interpreted surfaces, horizon and fault surfaces and automatically-generated reservoir model using the generative networks trained with the SEAM Foothill geological data. In the examples illustrated in FIGS. 9 and 10, the structural frameworks are extracted from the structural framework shown in FIG. 9(*b*) of Regone et al. 2017, and manipulated to represent unseen structural framework as shown in first column of FIGS. 9 and 10 (1100, 1200). The corresponding outputs of the generative model trained with the paired samples from the structural framework and its seismic image (FIGS. 9(b) and 11(a) respectively of Regone et al. 2017) are shown in the second column of FIGS. 9 and 10 (1150, 1250). As shown in FIGS. 9 and 10, the generative model successfully mimics what it learned from the training data and outputs a realistic models in the sense of the training set.

In all practical applications, the present technological advancement must be used in conjunction with a computer, programmed in accordance with the disclosures herein. For example, FIG. 11 is a diagram of an exemplary computer system 1300 that may be utilized to implement methods described herein. A central processing unit (CPU) 1302 is coupled to system bus 1304. The CPU 1302 may be any general-purpose CPU, although other types of architectures of CPU 1302 (or other components of exemplary computer system 1300) may be used as long as CPU 1302 (and other components of computer system 1300) supports the operations as described herein. Those of ordinary skill in the art will appreciate that, while only a single CPU 1302 is shown in FIG. 11, additional CPUs may be present. Moreover, the computer system 1300 may comprise a networked, multi-processor computer system that may include a hybrid parallel CPU/GPU system. The CPU 1302 may execute the various logical instructions according to various teachings disclosed herein. For example, the CPU 1302 may execute machine-level instructions for performing processing according to the operational flow described.

The computer system 1300 may also include computer components such as non-transitory, computer-readable media. Examples of computer-readable media include a random access memory (RAM) 1306, which may be SRAM, DRAM, SDRAM, or the like. The computer system 1300 may also include additional non-transitory, computer-readable media such as a read-only memory (ROM) 1308, which may be PROM, EPROM, EEPROM, or the like. RAM 1306 and ROM 1308 hold user and system data and programs, as is known in the art. The computer system 1300 may also include an input/output (I/O) adapter 1310, a graphics processing unit (GPU) 1314, a communications adapter 1322, a user interface adapter 1324, a display driver 1316, and a display adapter 1318.

The I/O adapter 1310 may connect additional non-transitory, computer-readable media such as storage device(s) 1312, including, for example, a hard drive, a compact disc (CD) drive, a floppy disk drive, a tape drive, and the like to computer system 1300. The storage device(s) may be used when RAM 1306 is insufficient for the memory requirements associated with storing data for operations of the present techniques. The data storage of the computer system 1300 may be used for storing information and/or other data used or generated as disclosed herein. For example, storage device(s) 1312 may be used to store configuration information or additional plug-ins in accordance with the present techniques. Further, user interface adapter 1324 couples user input devices, such as a keyboard 1328, a pointing device 1326 and/or output devices to the computer system 1300. The display adapter 1318 is driven by the CPU 1302 to control the display on a display device 1320 to, for example, present information to the user such as subsurface images generated according to methods described herein.

The architecture of computer system 1300 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 1300 may include various plug-ins and library files. Input data may additionally include configuration information.

Preferably, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM or other cloud computing based vendors such as Microsoft and Amazon.

The above-described techniques, and/or systems implementing such techniques, can further include hydrocarbon management based at least in part upon the above techniques, including using the one or more generated geological models in one or more aspects of hydrocarbon management. For instance, methods according to various embodiments may include managing hydrocarbons based at least in part upon the one or more generated geological models and data representations (e.g., seismic images, feature probability maps, feature objects, etc.) constructed according to the above-described methods. In particular, such methods may include drilling a well, and/or causing a well to be drilled, based at least in part upon the one or more generated geological models and data representations discussed herein (e.g., such that the well is located based at least in part upon a location determined from the models and/or data representations, which location may optionally be informed by other inputs, data, and/or analyses, as well) and further prospecting for and/or producing hydrocarbons using the well. For example, the different stages of exploration may result in data being generated in the respective stages, which may be iteratively used by the machine learning to generate the one or more geological models discussed herein.

It is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

REFERENCES

The following references are hereby incorporated by reference herein in their entirety:

T. Zhang, *Incorporating Geological Conceptual Models and Interpretations into Reservoir Modeling Using Multiple-Point Geostatistics*, Earth Science Frontiers, 15(1), 2008.

J. Andersson and J. A. Hudson, *T-H-M-C Modelling of Rock Mass Behaviour—1: The Purposes, The Procedures and The Products*, Geo-Engineering, Elsevier, 2004, Pages 433-438

I. J. Goodfellow, J. Pouget-Abadie, M. Mirza, B. Xu, D. Warde-Farley, S. Ozair, A. Courville and Y. Bengio, *Generative Adversarial Networks*, NIPS, 2014.

P. Isola, J.-Y. Zhu, T. Zhou and A. A. Efros, *Image-to-Image Translation with Conditional Adversarial Networks*, arXiv:1611.07004v3, 2018.

C. Regone, J. Stefani, P. Wang, C. Gerea, G. Gonzalez, and M. Oristaglio, *Geologic model building in SEAM Phase II—Land seismic challenges*, The Leading Edge, 2017.

J. Y. Zhu, R. Zhang, D. Pathak, T. Darrell, A. A. Efros, O. Wang, E. Shechtman, *Toward Multimodal Image-to-Image Translation*, NIPS, 2017.

X. Chen, Y. Duan, R. Houthooft, J. Schulman and I. Sutskever, *InfoGAN: Interpretable Representation Learning by Information Maximizing Generative Adversarial Nets*, 2016; arXiv:1606.03657.

W. Fedus, M. Rosca, B. Lakshminarayanan, A. M. Dai, S. Mohamed and I. Goodfellow, *Many Paths to Equilibrium: GANs Do Not Need to Decrease A Divergence at Every Step*, International Conference on Learning Representations, 2018; arXiv:1710.08446

The invention claimed is:

1. A machine learning method for generating one or more geological models of a subsurface, the method comprising:
   accessing conditioning data for one stage of hydrocarbon management related to the subsurface, the one stage comprising one of an exploration stage or a development stage;
   accessing one or more geological concepts related to a target subsurface;
   accessing one or more input geological models of the subsurface;
   training a first iteration of a machine learning model using the conditioning data for the one stage of hydrocarbon management, the one or more geological concepts, and the one or more input geological models;
   generating, based on the first iteration of the machine learning model, one or more geological models;
   using the one or more geological models generated based on the first iteration of the machine learning model for the one stage of hydrocarbon management;
   accessing conditioning data for a subsequent stage of hydrocarbon management related to the subsurface, the subsequent stage comprising a different and later stage to the one stage and comprising one of the development stage or a production stage, the conditioning data for the subsequent stage being different from the conditioning data for the one stage;
   training a second iteration of the machine learning model using the conditioning data for the subsequent stage of hydrocarbon management, wherein the training of the second iteration of the machine learning model is further dependent on one or both of the conditioning data for the one stage of hydrocarbon management used in the first iteration or the machine learning model trained in the first iteration;
   generating, based on the second iteration of the machine learning model, one or more geological models for the subsequent stage of hydrocarbon management; and
   using the one or more geological models generated based on the second iteration of the machine learning model for the subsequent stage of hydrocarbon management.

2. The method of claim 1, wherein the one or more input geological models of the subsurface comprise one or more input reservoir models of the subsurface; and
   wherein the conditioning data for at least one of the one stage of hydrocarbon management or the subsequent stage of hydrocarbon management comprises geophysical data including field seismic data or simulated seismic data.

3. The method of claim 1, wherein the conditioning data for at least one of the one stage of hydrocarbon management or the subsequent stage of hydrocarbon management comprises one or more of a structural framework, an internal reservoir architecture, or petrophysical property maps.

4. The method of claim 1, wherein the machine learning model trained in at least one of the first iteration or second iteration maps a fixed set of conditioning data for at least one of the one stage of hydrocarbon management or the subsequent stage of hydrocarbon management and at least one of varying noise or varying latent code to a plurality of reservoir models.

5. The method of claim 4, wherein the machine learning model trained in at least one of the first iteration or second iteration comprises a generative adversarial network (GAN) including a generator and a discriminator.

6. The method of claim 5, wherein the discriminator comprises a discriminator network model; and wherein the discriminator network model comprises a classifier network model.

7. The method of claim 5, wherein the generator comprises a generator network model; and wherein the generator network model comprises a U-net model.

8. The method of claim 5, wherein the generator comprises a generator network model; and
wherein the generator network model comprises an autoencoder or variational autoencoder model including an encoder and a decoder.

9. The method of claim 5, wherein the one or more geological concepts are input to the GAN.

10. The method of claim 9, wherein the one or more input geological models of the subsurface comprise simulated reservoir models of the subsurface.

11. The method of claim 9, further comprising accessing one or more reservoir stratigraphic configurations of a reservoir model;
wherein training the machine learning model in at least one of the first iteration or second iteration is further performed based on the one or more reservoir stratigraphic configurations of the reservoir model; and
wherein the machine learning model trained in at least one of the first iteration or second iteration learns to generate the one or more reservoir stratigraphic configurations of the reservoir model by varying values of noise or latent code variables.

12. The method of claim 5, wherein the GAN uses stratigraphic sketches and corresponding seismic data or petrophysical data associated with seismic data as a training set.

13. The method of claim 5, wherein the GAN uses computational stratigraphy to generate stratigraphic models and seismic simulations or petrophysical data associated with seismic data as a training set.

14. The method of claim 1, wherein the conditioning data comprises geophysical data;
wherein the machine learning model trained in at least one of the first iteration or second iteration generates a plurality of reservoir models based on the conditioning data for at least one of the one stage of hydrocarbon management or the subsequent stage of hydrocarbon management and the one or more geological concepts; and
further comprising quantifying uncertainty of anticipated reservoir performance in the subsurface using the plurality of reservoir models.

15. The method of claim 14, wherein quantifying uncertainty of anticipated reservoir performance comprises estimating one or more statistical distributions of target reservoir quantities including one or more of: net-to-gross; spatial continuity; distribution of dynamic properties affecting fluid flow conditions; or distribution of petrophysical properties.

16. The method of claim 1, wherein using the one or more geological models based on the first iteration of the machine learning model or the second iteration of the machine learning model comprises modifying at least one of reservoir development, depletion, or management in the subsurface.

17. The method of claim 16, wherein modifying at least one of reservoir development, depletion, or management comprises modifying a trajectory of a borehole in the subsurface.

18. The method of claim 1, wherein using the one or more geological models based on the first iteration of the machine learning model or the second iteration of the machine learning model comprises causing a well to be drilled in the subsurface based upon the one or more geological models.

19. The method of claim 1, wherein the one or more geological models based on the first iteration of the machine learning model or the second iteration of the machine learning model are generated for multiple stages of a life cycle of an oil and gas field including exploration, development and production.

20. The method of claim 19, wherein the machine learning model trained in both the first iteration and the second iteration comprises a generative adversarial network (GAN) including a generator and a discriminator; and
wherein the generator is iteratively updated or continually trained for multiple stages of the life cycle of an oil and gas field including the exploration stage, the development stage, and the production stage.

21. The method of claim 19, wherein in the first iteration, a first set of geological data is used by machine learning in order to generate a first set of geological models;
wherein in the second iteration, a second set of geological data is used by the machine learning in order to generate a second set of geological models;
wherein the second set of geological data is different from the first set of geological data; and
wherein the first set of geological models is different from the second set of geological models.

22. The method of claim 1, wherein the conditioning data for at least one of the one stage of hydrocarbon management or the subsequent stage of hydrocarbon management comprises synthetically-generated conditioning data; and
further comprising:
manipulating or augmenting the synthetically-generated conditioning data with structured noise; and
using the manipulated or augmented synthetically-generated conditioning data in training the machine learning model.

23. The method of claim 22, wherein manipulating or augmenting the synthetically-generated conditioning data comprises using a style transfer approach in order to translate the synthetically-generated conditioning data into field data by manipulating a synthetic data style of the synthetically-generated conditioning data or by adding noise to the synthetically-generated conditioning data, the noise having a similar distribution as the field data.

24. The method of claim 23, wherein the synthetically-generated conditioning data is generated using one or more simulators; and
further comprising selecting the style transfer approach from a plurality of available style transfer approaches, wherein the selection of the style transfer approach is specific to a geological basin, a data acquisition type, or processing workflows in order to account for effects not modeled with the one or more simulators.

25. The method of claim 1, wherein the machine learning model trained in the second iteration is based on the machine learning model trained in the first iteration.

26. The method of claim 25, wherein training the second iteration of the machine learning model comprises fixing the machine learning model from the first iteration and expanding the machine learning model from the first iteration with an expanded part comprising additional layers trained with the conditioning data from the subsequent stage of hydrocarbon management.

27. The method of claim 1, wherein training the second iteration of the machine learning model comprises retraining the machine learning model as a whole.

28. The method of claim 27, wherein retraining the machine learning model as a whole uses the conditioning data for the one stage of hydrocarbon management and the conditioning data for the subsequent stage of hydrocarbon management.

* * * * *